(12) United States Patent
Igarashi

(10) Patent No.: US 7,586,520 B2
(45) Date of Patent: Sep. 8, 2009

(54) IMAGE CORRECTION APPARATUS, IMAGE CORRECTION PROGRAM STORAGE MEDIUM, IMAGE CORRECTION METHOD, AND IMAGE CORRECTION SYSTEM

(75) Inventor: Takashi Igarashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 571 days.

(21) Appl. No.: 11/146,279

(22) Filed: Jun. 7, 2005

(65) Prior Publication Data
US 2006/0078218 A1  Apr. 13, 2006

(30) Foreign Application Priority Data

Jun. 7, 2004 (JP) ............................. 2004-168396
May 31, 2005 (JP) ............................. 2005-159413

(51) Int. Cl.
*H04N 5/228* (2006.01)

(52) U.S. Cl. ................. 348/208.6; 348/207.2; 382/199; 382/255; 396/52

(58) Field of Classification Search ............. 348/207.2, 348/208.99–208.16, 333.12, 208.6; 382/254–275, 382/286, 199; 396/53, 52; 250/208.1
See application file for complete search history.

(56) References Cited

U.S. PATENT DOCUMENTS

| | | | | |
|---|---|---|---|---|
| 5,561,498 | A * | 10/1996 | Sekine et al. ................. | 396/53 |
| 5,712,474 | A * | 1/1998 | Naneda .................... | 250/208.1 |
| 6,738,197 | B2 * | 5/2004 | Fujii .......................... | 359/698 |
| 6,771,308 | B1 * | 8/2004 | Yamamoto et al. ....... | 348/207.2 |
| 6,987,530 | B2 * | 1/2006 | McConica ............... | 348/208.6 |
| 2001/0022619 | A1 * | 9/2001 | Nishiwaki .................... | 348/208 |
| 2003/0002746 | A1 * | 1/2003 | Kusaka ....................... | 382/255 |
| 2003/0063815 | A1 * | 4/2003 | Watanabe .................... | 382/255 |
| 2004/0066981 | A1 * | 4/2004 | Li et al. ...................... | 382/286 |
| 2005/0046730 | A1 * | 3/2005 | Li .......................... | 348/333.12 |
| 2005/0179784 | A1 * | 8/2005 | Qi ........................... | 348/208.1 |
| 2005/0231603 | A1 * | 10/2005 | Poon .................... | 348/208.99 |

FOREIGN PATENT DOCUMENTS

| JP | 2000-137805 A | | 5/2000 |
|---|---|---|---|
| JP | 2004088567 A | * | 3/2004 |

OTHER PUBLICATIONS

Biemond et al., "Iterative Methods for Image Deblurring," Proceedings of the IEEE, vol. 78, No. 5, May 1990.*

Yitzhaky et al., "Comparison of Direct Blind Convolution Methods for Motion-blurred Images," Applied Optics, vol. 38, No. 20, Jul. 10, 1999.*

* cited by examiner

*Primary Examiner*—Lin Ye
*Assistant Examiner*—Dennis Hogue
(74) *Attorney, Agent, or Firm*—Sughrue Mion, PLLC

(57) ABSTRACT

The present invention has an object to provide an image correction apparatus which can correct image blur properly, a storage medium storing an image correction program which makes a computer operate as such an image correction apparatus, an image correction method for correcting the blur properly, and an image correction system which corrects the blur properly. The image correction apparatus which corrects image blur caused by movement of a photographic device shooting an image includes a trimming section which extracts a main subject area from the image, edge analyzing section which produces edge information about edges of the main subject area, blur analyzing section which produces blur information about blur of an input image based on multiple pieces of edge information passed by the edge analyzing section, and correction section which corrects the blur of the input image using the blur information passed by the blur analyzing section.

30 Claims, 24 Drawing Sheets

| SHOOTING MODE | REFERENCE POSITION | REFERENCE COLOR | WEIGHT RATIO (DISTANCE:COLOR) |
|---|---|---|---|
| STANDARD | HORIZONTAL:CENTER; VERTICAL:CENTER | SKIN COLOR | 1:2 |
| PORTRAIT | HORIZONTAL:CENTER; VERTICAL:TOP2/3 | SKIN COLOR | 2:1 |
| LANDSCAPE | HORIZONTAL:CENTER; VERTICAL:CENTER | GREEN COLOR | 1:1 |

IMAGE CORRECTION APPARATUS, IMAGE CORRECTION PROGRAM STORAGE MEDIUM, IMAGE CORRECTION METHOD, AND IMAGE CORRECTION SYSTEM

BACKGROUND OF THE INVENTION

Field of the Invention

The present invention relates to an image correction apparatus which corrects image blur caused by movement of a photographic device shooting an image, a storage medium storing an image correction program which makes a computer operate as such an image correction apparatus, an image correction method for correcting the blur, and an image correction system which corrects the blur.

Recently, with the advent of digital cameras which acquire photographic images as image data, image correction processes which perform predetermined data processing on the photographic images and thereby improve their image quality have become available. Such image correction processes include, for example, a recently-proposed technique which analyzes images to be processed, determines predetermined feature values which represent characteristics of the images, and performs correction processes on the images to be processed based on the feature values (refer to, for example, Japanese Patent Laid-Open No. 2000-137805, Paragraphs 0041 to 0157 and FIGS. 5 and 8).

Among image correction processes, there is particularly high demand for image correction processes for so-called camera shake, i.e., image blur caused by movement of a photographic device during shooting, all the more because camera-equipped cell phones which have recently sprung into wide use are liable to camera shake during shooting. As an example, it is conceivable to apply the technique disclosed in Japanese Patent Laid-Open No. 2000-137805 described above to an image correction process for such camera shake. In that case, image blur can be corrected by determining a feature value which represents characteristics of the image blur and subjecting the image to a correction process which cancels out the blur represented by the feature value.

However, such correction processes have a problem in that the blur is not corrected sufficiently or that unnecessary correction processes are often performed on those image parts which are not blurred originally.

SUMMARY OF THE INVENTION

The present invention has been made in view of the above circumstances and provides an image correction apparatus which can correct image blur properly, a storage medium storing an image correction program which makes a computer operate as such an image correction apparatus, an image correction method for correcting the blur properly, and an image correction system which corrects the blur properly.

The first image correction apparatus according to the present invention that achieves the above object is an image correction apparatus which corrects image blur caused by movement of a photographic device shooting an image, having:

a blur detection section which detects blur of the image in a main subject area of the image; and a correction section which corrects the blur detected by the blur detection section.

Conventionally, for example, in an auto-focus process of automatically achieving focus for a photographic image, there are known techniques which identify an image part of a main subject out of multiple image parts and focus on the identified image part. There are also known techniques which identify a main subject such as a person in a photographic image and emit a flash automatically when the main subject is backlit. The "main subject area" of the first image correction apparatus according to the present invention means an image part which can be identified by the above techniques, i.e., an image part showing a main subject.

A larger blur is likely to occur in such a main subject area during shooting than in the background distant from the photographer. If blur correction processes according to the conventional techniques, for example, are applied to the resulting image, a large blur in the main subject area may not be corrected sufficiently due to the influence of the background or other image parts with a relatively slight blur. Also, for example, when photographing people in a running vehicle, the background photographed through the window appears drifting. If the conventional blur correction processes described above are applied to such an image, even if the main subject area containing the people is not blurred, it is subjected to unnecessary processes used to correct the drift of the background.

Since the first image correction apparatus according to the present invention detects image blur in the main subject area and corrects the detected blur, it can correct image blur properly by avoiding such problems as insufficient blur correction in the main subject area and unnecessary correction processes carried out based on drift of the background.

In the first image correction apparatus according to the present invention, preferably the blur detection section detects blur of the image using an image part in a predetermined range containing the center of the image as the main subject area.

It is likely that a main subject rather than the background and the like is shown near the center of a photographic image. That is, a larger blur is likely to occur near the center during shooting than in other image parts. The preferred form of the first image correction apparatus makes it possible to easily perform a correction process of correcting image blur properly using a simple configuration for detection of image blur near the center.

Also, in the first image correction apparatus according to the present invention, preferably the blur detection section detects blur of the image using an image part which has a color in a predetermined color range as the main subject area.

For example, in the case of an image which has captured human faces, by extracting an image part which has skin color, it is possible to extract the main subject area containing the human faces from the image. In the case of an image which has captured a red car, by extracting an image part which has red color, it is possible to extract the main subject area containing the red car from the image. In this way, the main subject area can be distinguished from the background and the like by color. The preferred form of the first image correction apparatus makes it possible to easily perform a correction process of correcting image blur properly using a simple configuration for detection of image blur in an image part which has a color in a predetermined color range.

The second image correction apparatus according to the present invention that achieves the above object is an image correction apparatus which corrects image blur caused by movement of a photographic device shooting an image, having:

a blur detection section which detects blur in plural locations in the image;

a blur calculation section which calculates blur of the image by summing up detection results produced by the blur detection section at the plural locations with weights assigned to the detection results based on a predetermined weighing standard; and a correction section which corrects the blur of the image based on calculation results produced by the blur calculation section.

The second image correction apparatus according to the present invention allows detection results in the image part containing a main subject to be fully reflected in the calculation results using a weighing standard which, for example, assigns light weights to detection results obtained in the background. Then, the image blur is corrected based on the calculation results. That is, since the second image correction apparatus according to the present invention can perform a correction process based on the calculation results in which the blur in the image part containing a main subject is fully reflected, it can correct image blur properly.

In the second image correction apparatus according to the present invention, preferably the blur calculation section gives lighter weights to detection results obtained at locations more distant from the center of the image.

As described above, it is likely that a main subject is shown near the center of a photographic image. The preferred form of the second image correction apparatus makes it possible to easily perform a correction process based on the calculation results in which the blur in the image part containing the main subject is fully reflected using a simple weighing standard which gives lighter weights to detection results obtained at locations more distant from the center of the image.

Also, in the second image correction apparatus according to the present invention, preferably the blur calculation section gives lighter weights to detection results obtained at locations more distant from a predetermined reference color.

As described above, the image part containing a main subject can be distinguished from the background and the like by color. The preferred form of the second image correction apparatus makes it possible to easily perform a correction process based on the calculation results in which the blur in the image part containing the main subject is fully reflected using a simple weighing standard which gives lighter weights to detection results obtained at locations more distant from a reference color such as the color of the main subject or the like.

Also, in the second image correction apparatus according to the present invention, preferably:

the photographic device has plural shooting modes for the shooting;

the image correction apparatus has a shooting mode acquisition section which acquires a shooting mode used to shoot the image to be corrected for blur; and the blur calculation section assigns weights based on a weighing standard in accordance with the shooting mode acquired by the shooting mode acquisition section.

Some photographic devices have various shooting modes suitable for various subjects such as people and landscapes. The position and coloring of the main image part in the image obtained by shooting varies with the shooting mode. The preferred form of the second image correction apparatus can, for example, assign a large weight to the main image part estimated from the shooting mode while assigning different weights in different shooting modes, and thus can correct image blur more appropriately according to the shooting mode.

The first image correction program storage medium according to the present invention that achieves the above object is an image correction program storage medium storing an image correction program that runs on a computer and makes the computer operate as an image correction apparatus which corrects image blur caused by movement of a photographic device shooting an image, wherein the image correction program builds on the computer:

a blur detection section which detects blur of the image in a main subject area of the image; and a correction section which corrects the blur detected by the blur detection section.

The second image correction program storage medium according to the present invention that achieves the above object is an image correction program storage medium storing an image correction program that runs on a computer and makes the computer operate as an image correction apparatus which corrects image blur caused by movement of a photographic device shooting an image, wherein the image correction program builds on the computer:

a blur detection section which detects blur in plural locations in the image;

a blur calculation section which calculates blur of the image by summing up detection results produced by the blur detection section at the plural locations with weights assigned to the detection results based on a predetermined weighing standard; and a correction section which corrects the blur of the image based on calculation results produced by the blur calculation section.

The first and second image correction program storage media according to the present invention make it possible to easily implement image correction apparatus which can correct image blur properly.

Incidentally, description of the first and second image correction program storage media according to the present invention is limited to description of their basic forms to avoid redundancy. However, the first and second image correction program storage media according to the present invention also include various forms corresponding to the various forms of the first and second image correction apparatus, respectively.

The first image correction method according to the present invention that achieves the above object is an image correction method which corrects image blur caused by movement of a photographic device shooting an image, having:

a blur detection step of detecting blur of the image in a main subject area of the image; and a correction step of correcting the blur detected in the blur detection step.

The second image correction method according to the present invention that achieves the above object is an image correction method which corrects image blur caused by movement of a photographic device shooting an image, having:

a blur detection step of detecting blur in plural locations in the image;

a blur calculation step of calculating blur of the image by summing up detection results produced in the blur detection step at the plural locations with weights assigned to the detection results based on a predetermined weighing standard; and a correction step of correcting the blur of the image based on calculation results produced in the blur calculation step.

The first and second image correction methods according to the present invention can easily perform an image correction process which can correct image blur properly.

Incidentally, description of the first and second image correction methods according to the present invention is limited to description of their basic forms to avoid redundancy. However, the first and second image correction methods according to the present invention also include various forms corresponding to the various forms of the first and second image correction apparatus, respectively.

The first image correction system according to the present invention that achieves the above object is an image correction system which corrects image blur caused by movement of a photographic device shooting an image, having:

an image transmitter device that includes a blur detection section which detects blur of the image in a main subject area of the image, and a transmitter section which transmits the image and the blur detected by the blur detection section; and an image receiver device that includes a receiver section which receives the image and blur from the transmitter section of the image transmitter device, and a correction section which corrects the blur contained in the image and received by the receiver section together with the image.

The second image correction system according to the present invention that achieves the above object is an image correction system which corrects image blur caused by movement of a photographic device shooting an image, having:

an image transmitter device that includes a blur detection section which detects blur in plural locations in the image, a blur calculation section which calculates blur of the image by summing up detection results produced by the blur detection section at the plural locations with weights assigned to the detection results based on a predetermined weighing standard, and a transmitter section which transmits the image and the blur calculated by the blur calculation section; and an image receiver device that includes a receiver section which receives the image and blur from the transmitter section of the image transmitter device, and a correction section which corrects the blur contained in the image and received by the receiver section together with the image.

The first and second image correction systems according to the present invention can correct image blur properly as in the case of the first and second image correction apparatus according to the present invention.

In the first or second image correction system according to the present invention, preferably:

the image transmitter device has a resolution lowering section which lowers resolution of the image according to the blur of the image; and the transmitter section of the image transmitter device transmits the image whose resolution has been lowered by the resolution lowering section.

By lowering the resolution of the image according to the blur of the image, the preferred form of the first or second image correction system can reduce data volume of image data of the image without significantly degrading the image. This reduces the time required to deliver the imaged from the image transmitter device to the image receiver device, thereby improving processing efficiency.

Also, in the first or second image correction system according to the present invention, preferably:

the image transmitter device is incorporated in the photographic device; and the image receiver device is incorporated in a printer which prints the image corrected for blur by the correction section.

The preferred form of the first or second image correction system can print the image acquired by the photographic device after correcting it for blur properly.

Incidentally, description of the first and second image correction systems according to the present invention is limited to description of their basic forms and peculiar forms to avoid redundancy. However, in addition to these forms, the first and second image correction systems according to the present invention also include various forms corresponding to the various forms of first and second image correction apparatus, respectively.

As described above, the present invention can provide an image correction apparatus which can correct image blur properly, an image correction program which makes a computer operate as such an image correction apparatus, an image correction method for correcting the blur properly, and an image correction system which corrects the blur properly.

BRIEF DESCRIPTION OF THE DRAWINGS

FIG. 22 is a diagram showing a table used to determine reference positions, reference colors, and maximum values of two types of weight w1 and w2;

DETAILED DESCRIPTION OF THE INVENTION

Embodiments of the present invention will be described below with reference to the drawings.

Figure 1:
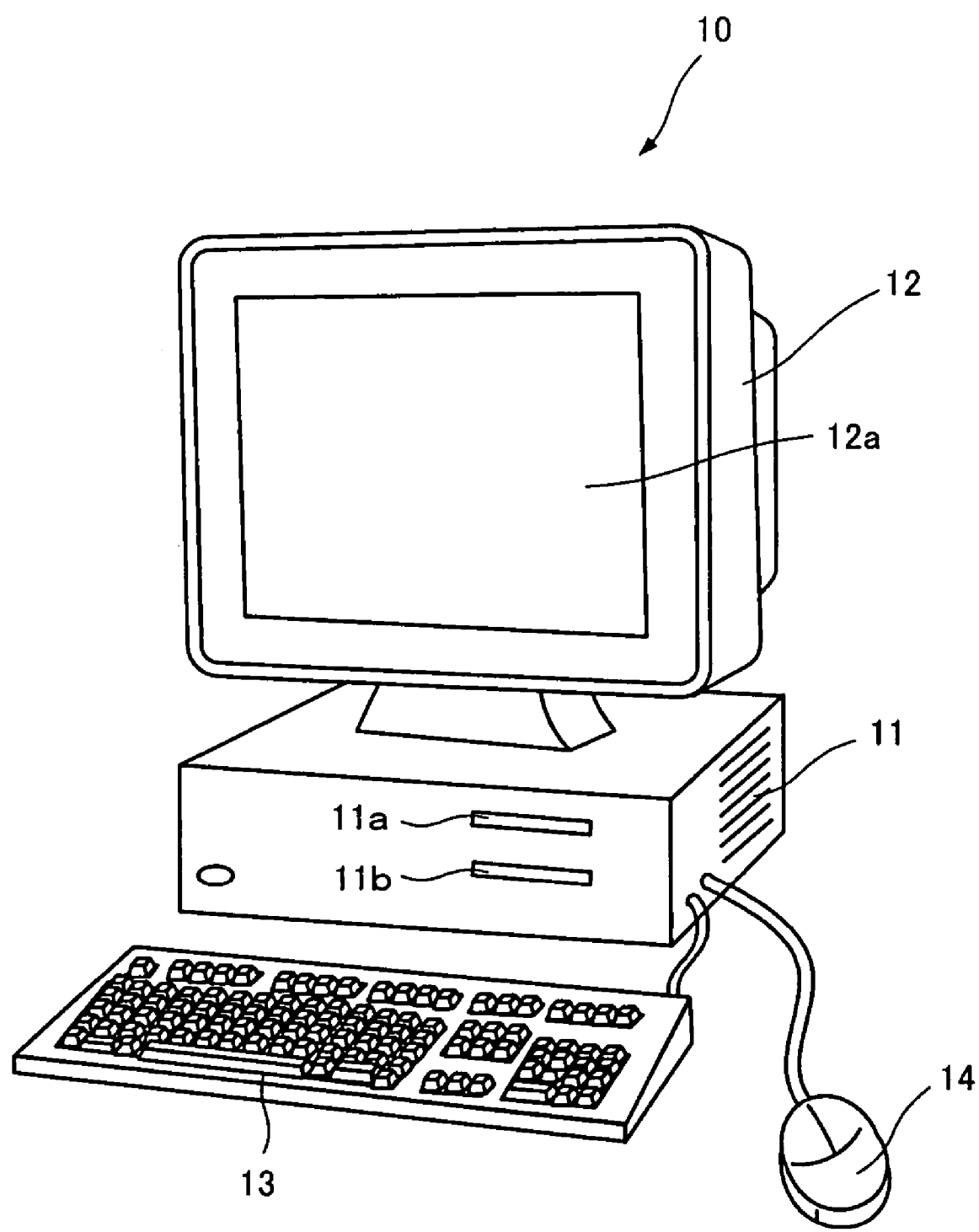
FIG. 1 is an external perspective view of a personal computer which operates as an embodiment of the image correction apparatus according to the present invention.
Figure 2:
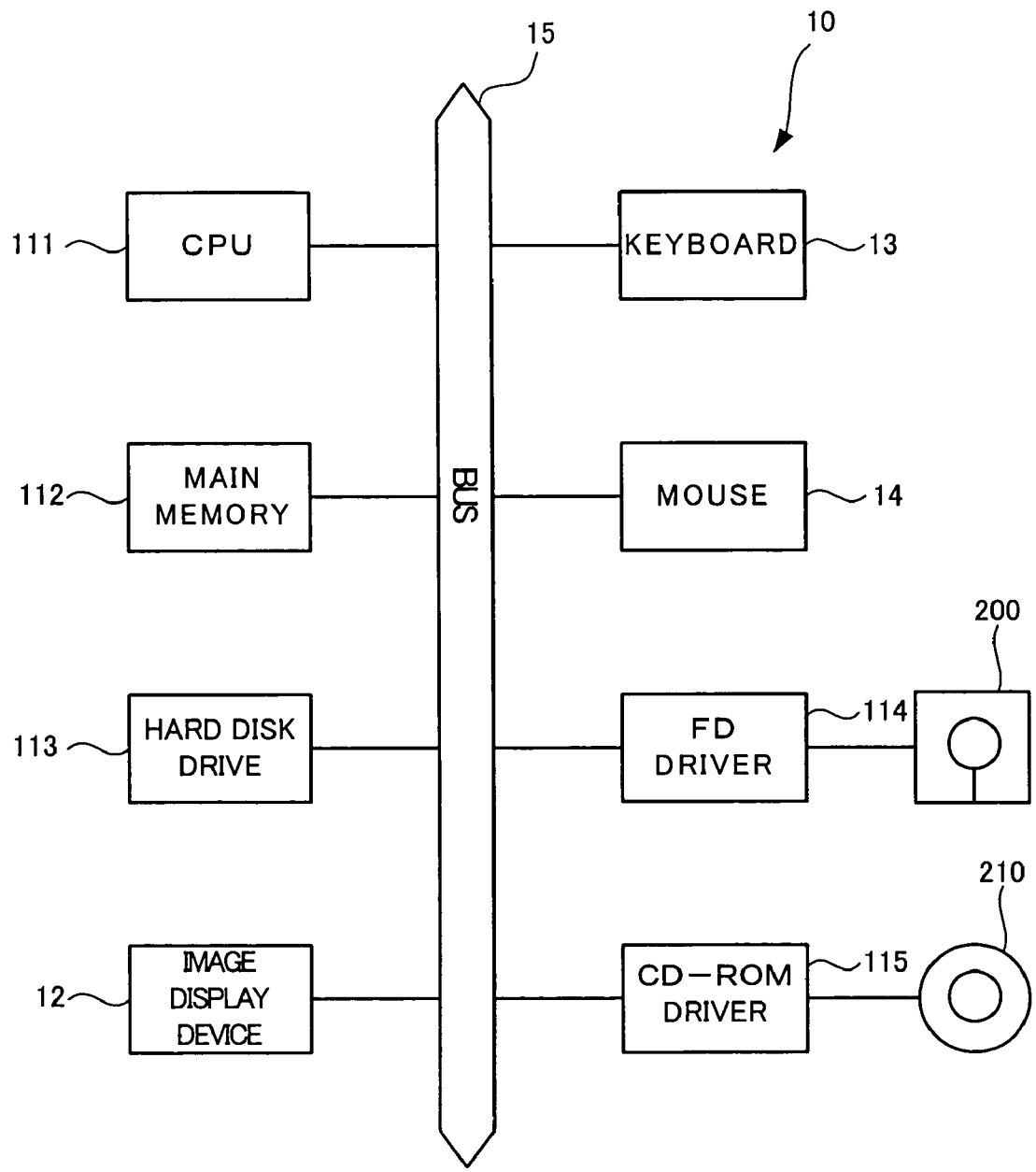
FIG. 2 is a diagram showing a hardware configuration of the personal computer.

FIG. 1 is an external perspective view of a personal computer which operates as an embodiment of the image correction apparatus according to the present invention and FIG. 2 is a diagram showing a hardware configuration of the personal computer.

In terms of external configuration, the personal computer 10 has a main device 11, an image display device 12 which displays images on a display screen 12a in response to instructions from the main device 11, a keyboard 13 for use to input various information according to keystrokes into the main device 11, and a mouse 14 for use to specify a desired location on the display screen 12a and thereby input a command corresponding to an icon or the like displayed at the specified location. When viewed from outside, the main device 11 is equipped with an FD slot 11a used to mount a flexible disk (hereinafter abbreviated to as an FD) and a CD-ROM slot 11b used to mount a CD-ROM.

As shown in FIG. 2, the main device 11 contains a CPU 111 which runs various programs, a main memory 112 into which programs read out of a hard disk drive 113 are loaded for execution by CPU 111, the hard disk drive 113 which stores various programs and data, an FD drive 114 which accesses an FD 200 inserted in it, and a CD-ROM drive 115 which accesses a CD-ROM 210 mounted in it. These components as well as the image display device 12, keyboard 13, and mouse 14 also shown in FIG. 1 are interconnected via a bus 15.

The CD-ROM 210 stores an image correction program which makes the personal computer 10 operate as an embodiment of the image correction apparatus according to the present invention. The CD-ROM 210 is mount in the CD-ROM drive 115 and the image correction program stored in the CD-ROM 210 is uploaded onto the personal computer 10 and stored in the hard disk drive 113. Thus, the personal computer 10 operates as an embodiment of the image correction apparatus according to the present invention.

If the image correction program stored in the CD-ROM 210 is an example of the image correction program according to the present invention, even when it is uploaded and stored in the hard disk drive 113 or further downloaded onto an FD 200, the resulting program constitutes an example of the image correction program according to the present invention.

A series of operations performed on the personal computer 10 based on the image correction program constitutes an embodiment of the image correction method according to the present invention.

Respective first embodiments of the image correction program storage medium, image correction method, and image correction apparatus according to the present invention will be described below.

Figure 3:
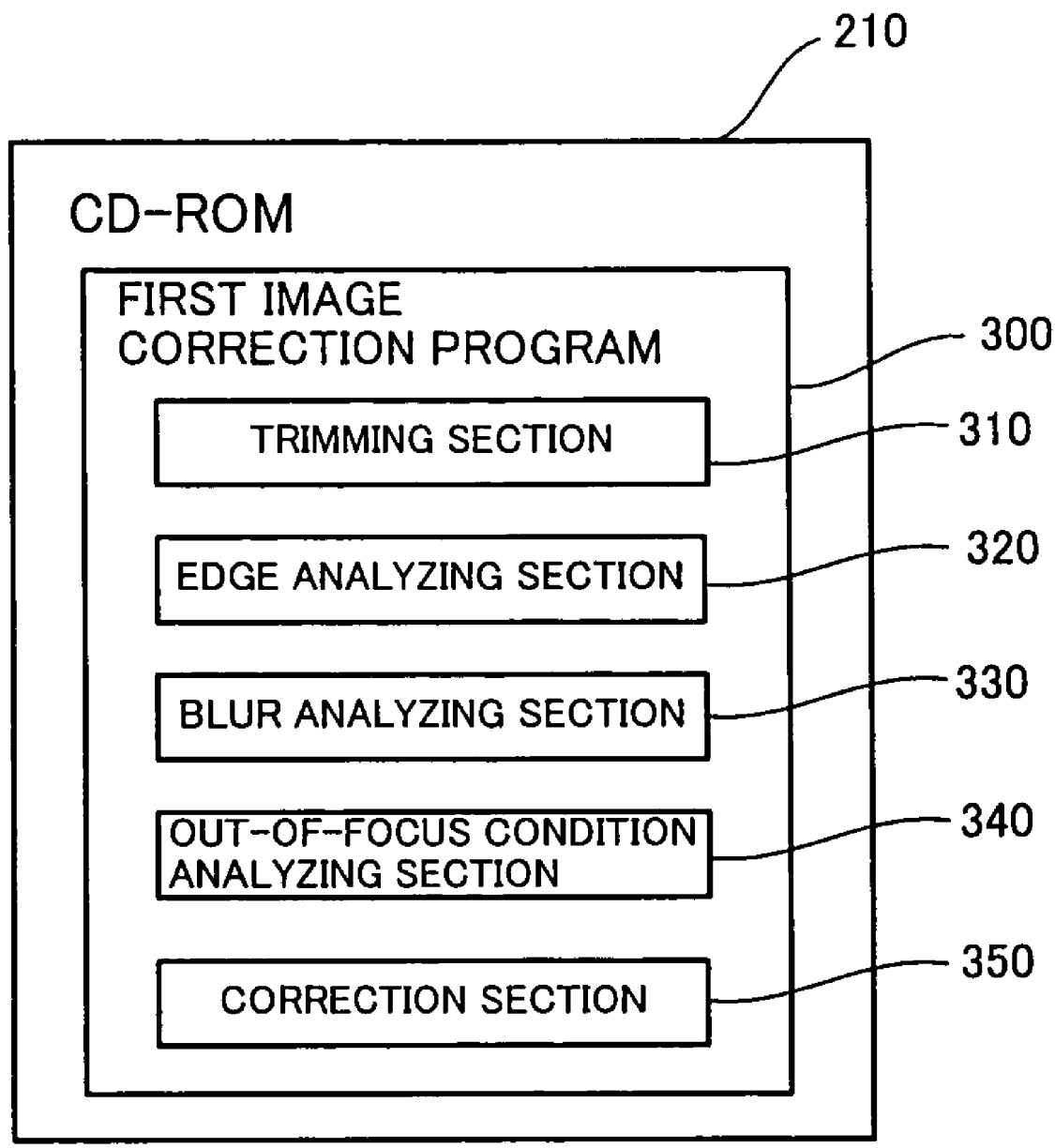
FIG. 3 is a conceptual diagram showing a CD-ROM which stores a first embodiment of the image correction program according to the present invention.

FIG. 3 is a conceptual diagram showing a CD-ROM which stores a first embodiment of the image correction program according to the present invention.

A first image correction program 300 has a trimming section 310, edge analyzing section 320, blur analyzing section 330, out-of-focus condition analyzing section 340, and correction section 350. The combination of the trimming section 310, edge analyzing section 320, and blur analyzing section 330 provides an example of the blur detection section of the first image correction apparatus according to the present invention on the personal computer 10. Similarly, the correction section 350 provides an example of the correction section of the first image correction apparatus according to the present invention. Details of various components of the first image correction program 300 will be described together with operation of various components of a first embodiment of the image correction apparatus according to the present invention.

Next, description will be given of the first embodiment of the image correction method according to the present invention.

Figure 4:
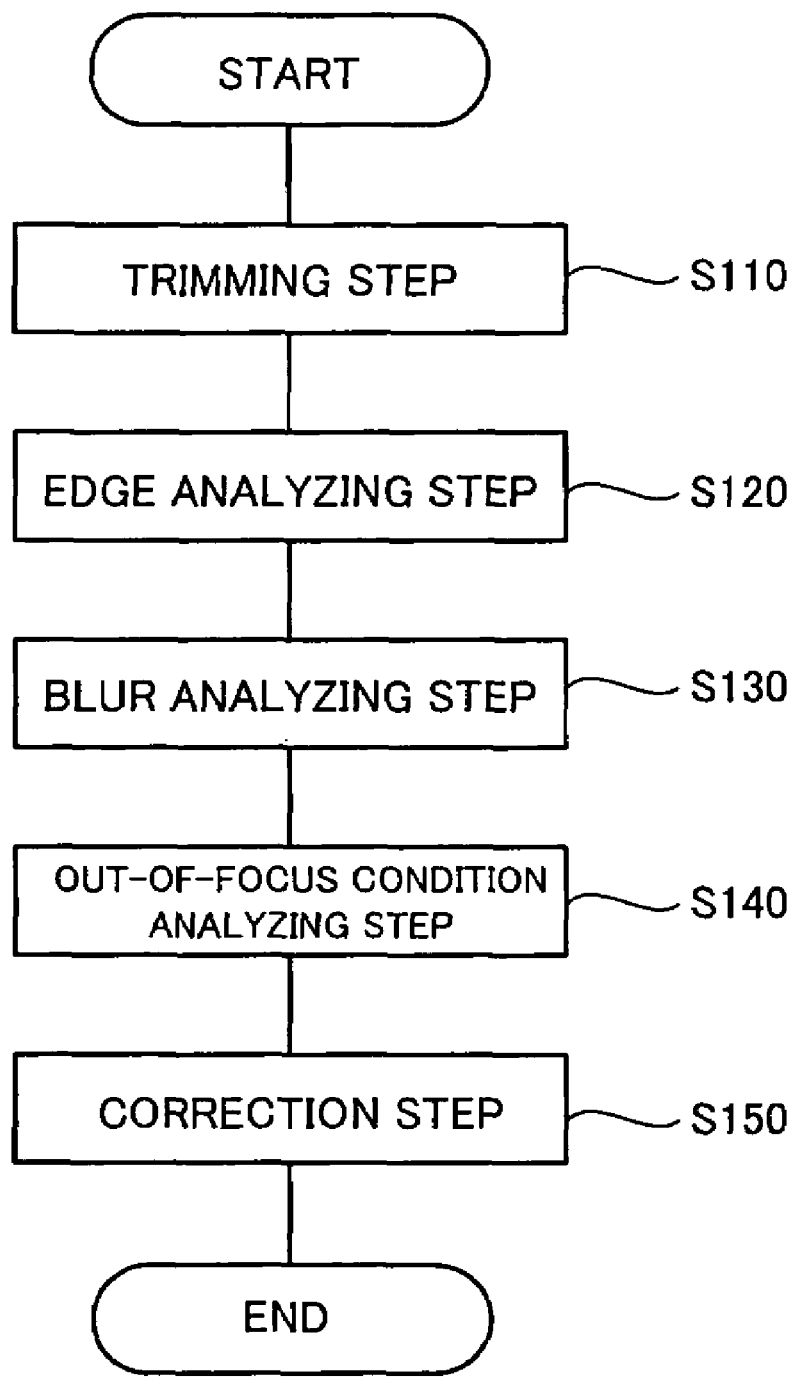
FIG. 4 is a flowchart showing a first embodiment of the image correction method according to the present invention.

FIG. 4 is a flowchart showing the first embodiment of the image correction method according to the present invention.

The first image correction method shown in FIG. 4 has a trimming step (step S110), edge analyzing step (step S120), blur analyzing step (step S130), out-of-focus condition analyzing step (step S140), and correction step (step S150) The combination of the trimming step (step S110), edge analyzing step (step S120), and blur analyzing step (step S130) provides an example of the blur detection step in the first image correction method according to the present invention while the correction step (step S150) provides an example of the correction step in the first image correction method according to the present invention. Details of various steps in the first image correction method will also be described together with operation of various components of the first embodiment of the image correction apparatus according to the present invention.

Figure 5:
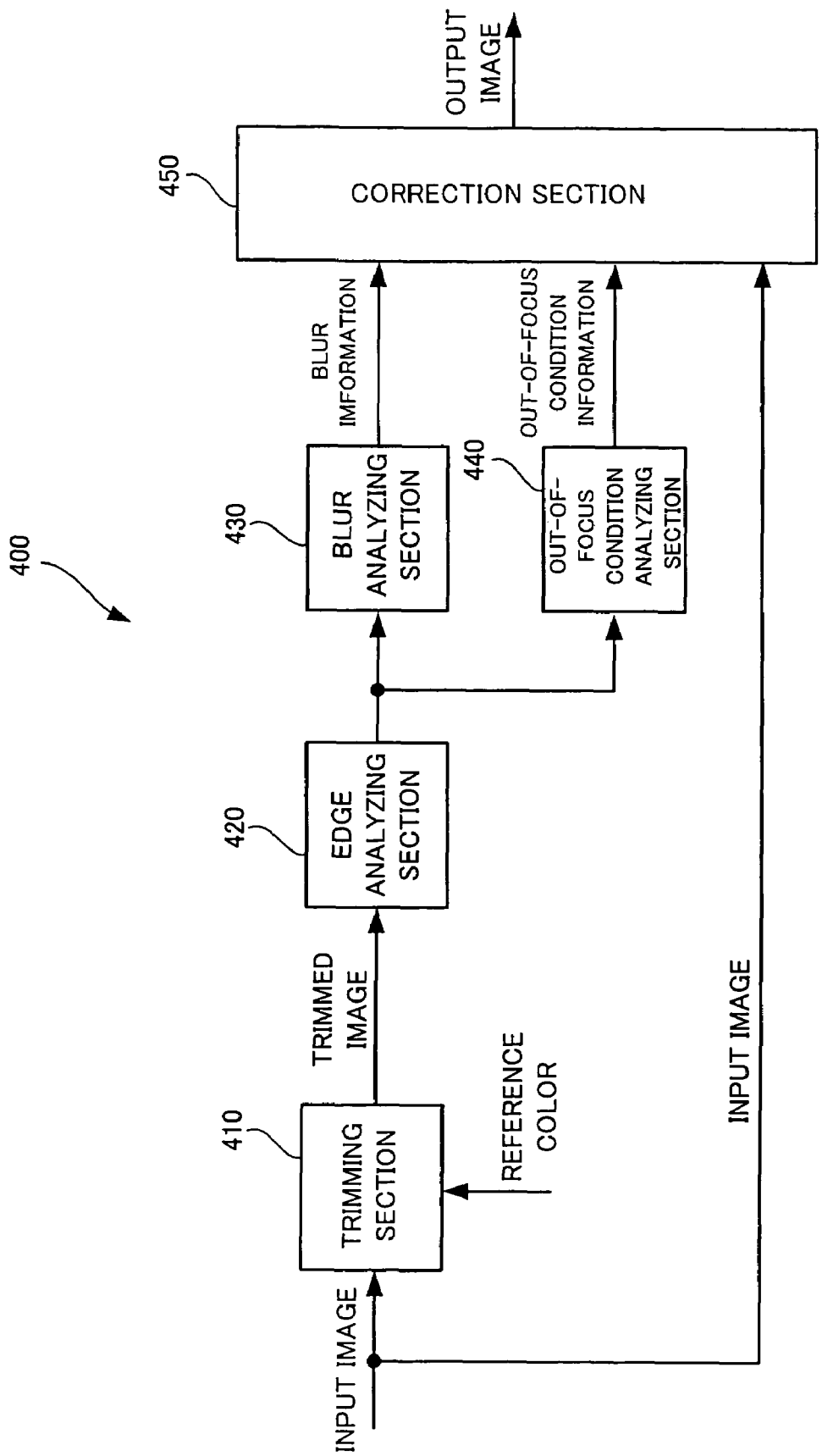
FIG. 5 is a functional block diagram showing a first embodiment of the image correction apparatus according to the present invention.

Next, description will be given of the first embodiment of the image correction apparatus according to the present invention FIG. 5 is a functional block diagram showing the first embodiment of the image correction apparatus according to the present invention.

The first image correction apparatus 400 shown in FIG. 5 has a trimming section 410, edge analyzing section 420, blur analyzing section 430, out-of-focus condition analyzing section 440, and correction section 450. The combination of the trimming section 410, edge analyzing section 420, and blur analyzing section 430 provides an example of the blur detection section of the first image correction apparatus according to the present invention. Similarly, the correction section 450 provides an example of the correction section of the first image correction apparatus according to the present invention.

The trimming section 410 first presents a message to the user, asking whether he/she wants to input a reference color such as skin color. The user gives an answer to the message. If the user expresses his/her wish to input a reference color, the trimming section 410 presents a message, prompting the user to specify a desired reference color. Then, the user specifies a reference color.

When the user finishes operations concerning a reference color, the trimming section 410 extracts an image part in a predetermined range containing the center from an input image to be processed. If the user has not expressed his/her desire to input a reference color in the above operations concerning a reference color, the image part in the predetermined range containing the center is passed to the edge analyzing section 420 as a trimmed image. On the other hand, if the user has specified a reference color in the above operations concerning a reference color, the trimming section 410 further extracts an image part which has a color in a predetermined color range including the specified reference color from the image part extracted first and passes it to the edge analyzing section 420 as a trimmed image.

The edge analyzing section 420 analyzes contours (hereinafter referred to as edges) of subjects in the trimmed image as described below and obtains edge information (described later) about the edges.

A process performed by the edge analyzing section 420 will be described with reference to a separate figure.

Figure 6:
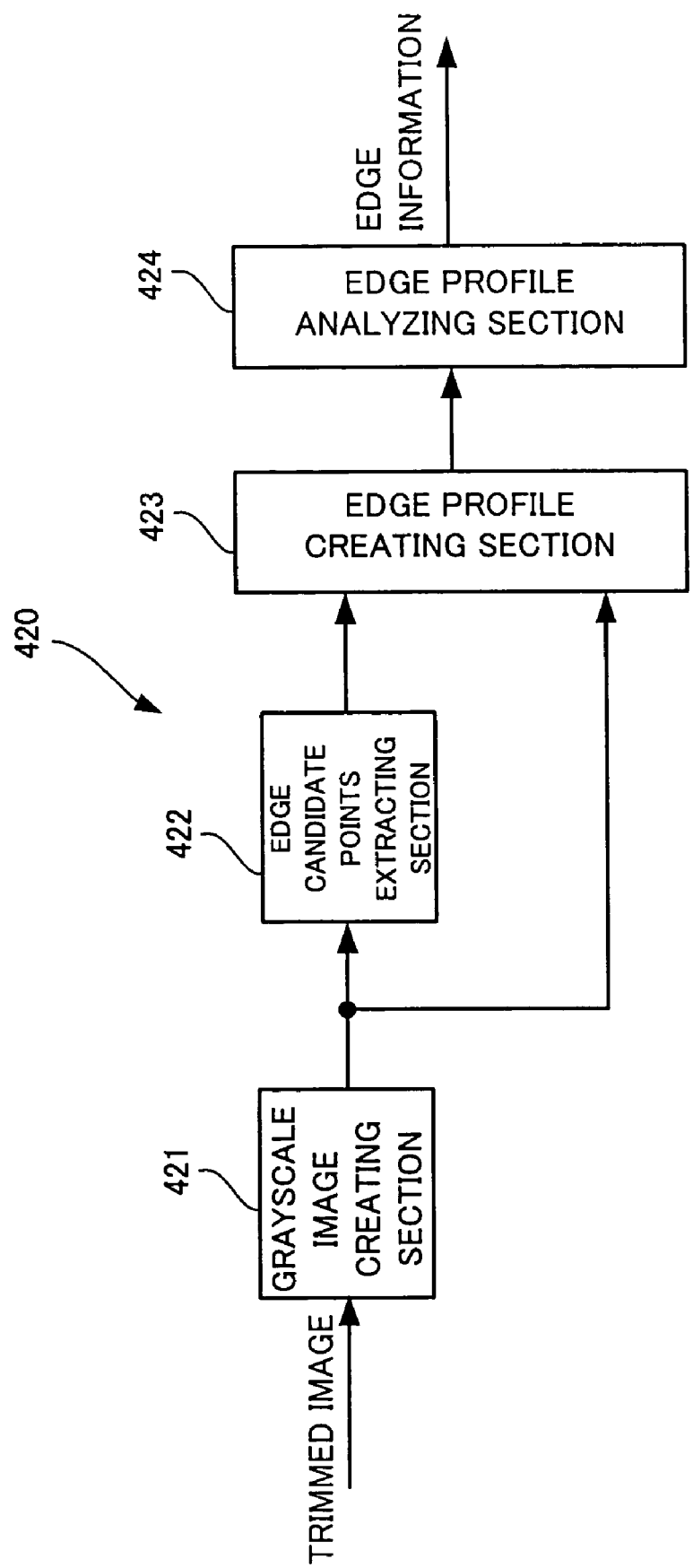
FIG. 6 is a functional block diagram showing details of an edge analyzing section.

FIG. 6 is a functional block diagram showing details of the edge analyzing section.

As shown in FIG. 6, the edge analyzing section 420 has a grayscale image creating section 421, edge candidate points extracting section 422, edge profile creating section 423, and edge profile analyzing section 424.

The grayscale image creating section 421 creates a grayscale image which expresses the trimmed image in terms of lightness.

The edge candidate points extracting section 422 detects density gradients of the grayscale image in the following eight detection directions. Then, points at which a density gradient higher than a predetermined level is detected are extracted as edge candidate points on the edges of the grayscale image.

Figure 7:
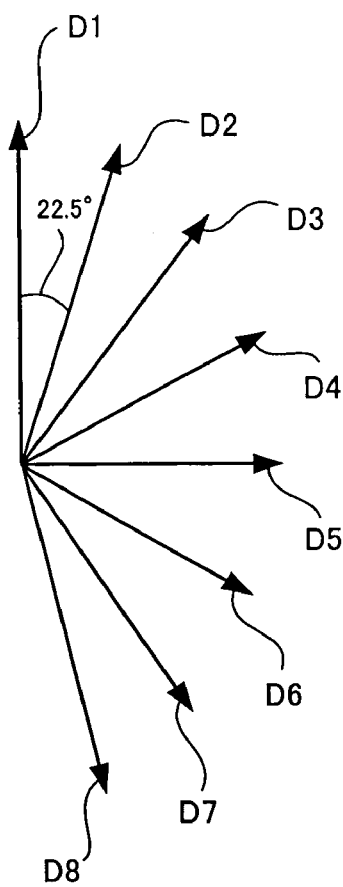
FIG. 7 is a diagram showing eight detection directions in detection of density gradients.

FIG. 7 is a diagram showing the eight detection directions in detection of density gradients.

As shown in FIG. 7, density gradients are detected in eight directions (D1, . . . , and D8) 22.5 degrees apart from each other.

The edge profile creating section 423 creates an edge profile for each of the extracted edge candidate points, depicting density changes at the given edge candidate point along the eight directions D1, . . . , and D8 in FIG. 7 over a predetermined range.

Figure 8:
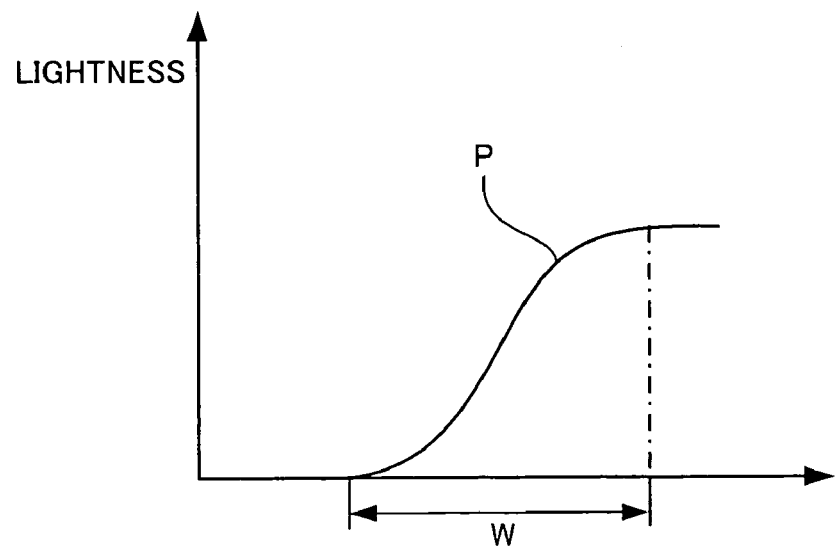
FIG. 8 is a diagram showing an example of an edge profile produced as edge information by the edge analyzing section.

FIG. 8 is a diagram showing an example of an edge profile produced as edge information by the edge analyzing section.

FIG. 8 shows a curve (hereinafter referred to as an edge profile) P which is obtained by plotting the lightness of individual points in the grayscale image along one of the eight directions D1, . . . , and D8 and represents density changes along the given direction.

FIG. 8 also shows width (hereinafter referred to as edge width) W of the density changes. The edge width W depends on the extent of defocusing (hereinafter referred to as out-of-focus condition) or blur of the input image. The larger the extent of out-of-focus condition or blur, the larger the edge width W; and the smaller the extent of out-of-focus condition or blur, the smaller the edge width W.

The edge profile analyzing section 424 in FIG. 6 removes complex shaped edge profiles P and edge profiles which represent density changes at lightness higher than a predetermined level from multiple edge profiles P created by the edge profile creating section 423. Then, it passes the remaining edge profiles P as edge information to the blur analyzing section 430 and out-of-focus condition analyzing section 440 shown in FIG. 5.

The blur analyzing section 430 shown in FIG. 5 produces blur information about blur of the input image as described below based on multiple pieces of edge information passed by the edge analyzing section 420.

A process performed by the blur analyzing section 430 will be described with reference to a separate figure.

Figure 9:
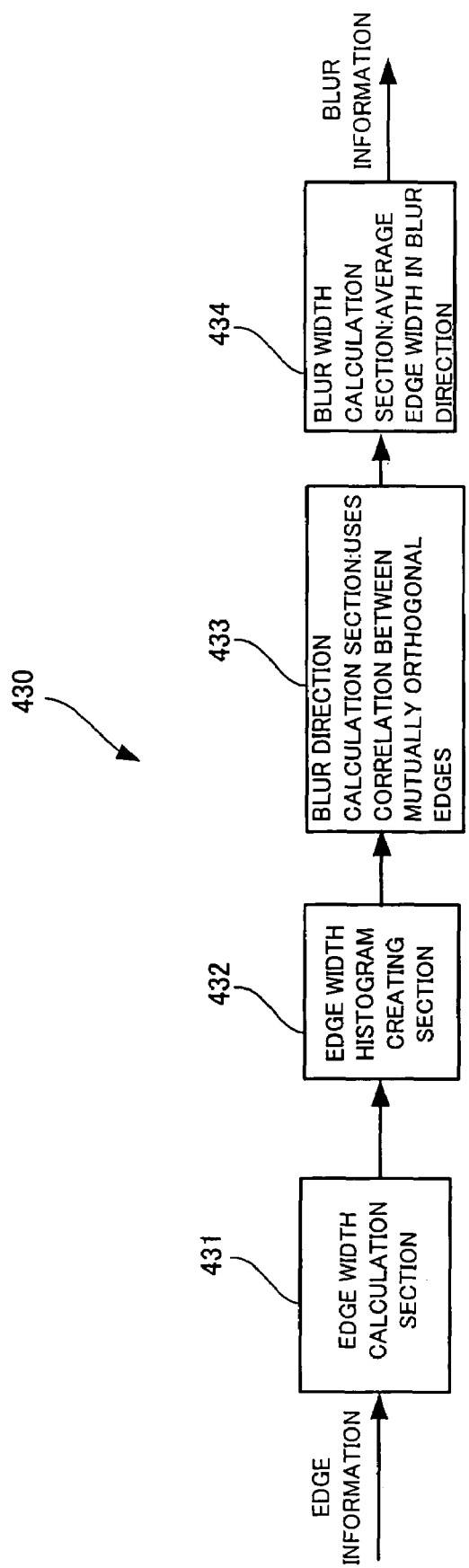
FIG. 9 is a functional block diagram showing details of the blur analyzing section shown in FIG. 5.

FIG. 9 is a functional block diagram showing details of the blur analyzing section shown in FIG. 5 The blur analyzing section 430 shown in FIG. 9 has an edge width calculation section 431, edge width histogram creating section 432, blur direction calculation section 433, and blur width calculation section 434.

The edge width calculation section 431 calculates the edge width W from each of the multiple edge profiles.

The edge width histogram creating section 432 classifies the multiple edge widths calculated by the edge width calculation section 431 into eight types according to the eight directions D1, . . . , and D8 shown in FIG. 7 and creates an edge width histogram for each direction.

Figure 10:
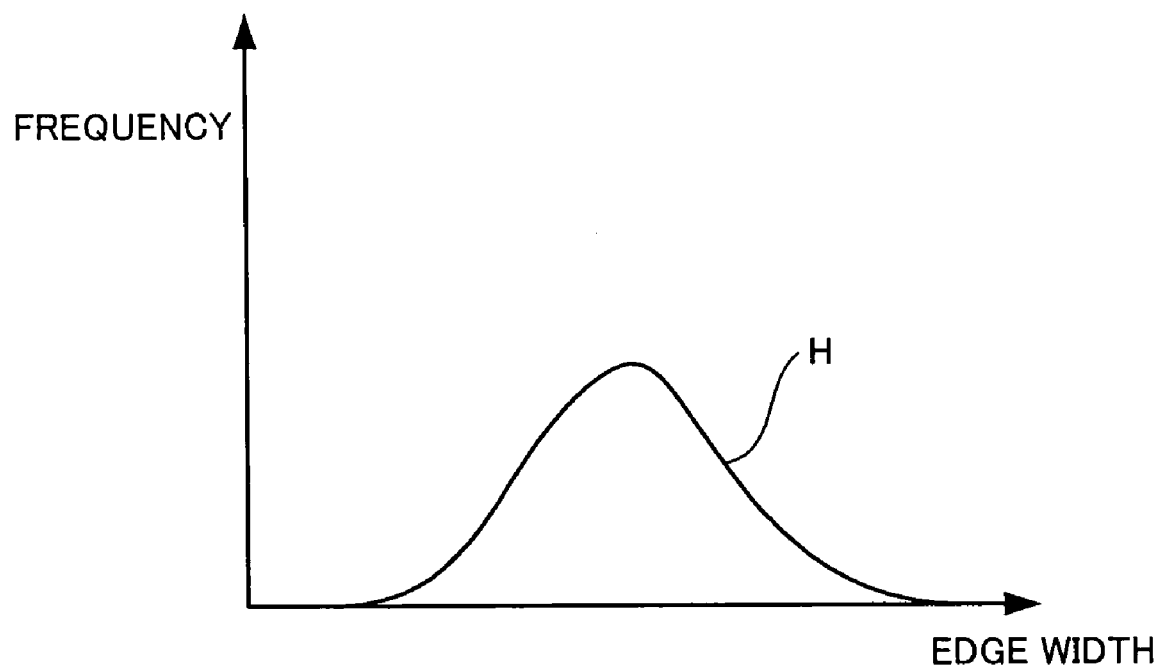
FIG. 10 is a diagram showing an example of an edge width histogram created by an edge width histogram creating section shown in FIG. 9.

FIG. 10 is a diagram showing an example of an edge width histogram created by the edge width histogram creating section shown in FIG. 9.

FIG. 10 shows an edge width histogram H obtained by plotting frequencies against values of edge width.

The blur direction calculation section 433 shown in FIG. 9 produces four pairs of histograms corresponding to four pairs of mutually orthogonal directions—"D1" and "D5," "D2" and "D6," "D3" and "D7," and "D4" and "D8" in FIG. 7—from eight histograms created for the eight directions D1, . . . , and D8 shown in FIG. 7, respectively. Then, the blur direction calculation section 433 determines a correlation between each pair of histograms. Hereinafter, correlation is described as smaller with increasing distance between the two histograms along the horizontal axis.

For example, if a photographic device moves during shooting, the image blurs in the direction in which the photographic device has moved. Consequently, the edges in the image spreads in the direction of the blur. Also, the spread of the edge width resulting from the image blur decreases with increasing distance from the direction of the blur. That is, in such blurred images, the edge width has direction-dependent unevenness. In such a blurred image, the correlation between two edge width histograms for a pair of mutually orthogonal directions is smaller than the correlation between similar histograms created for an unblurred image.

Figure 11:
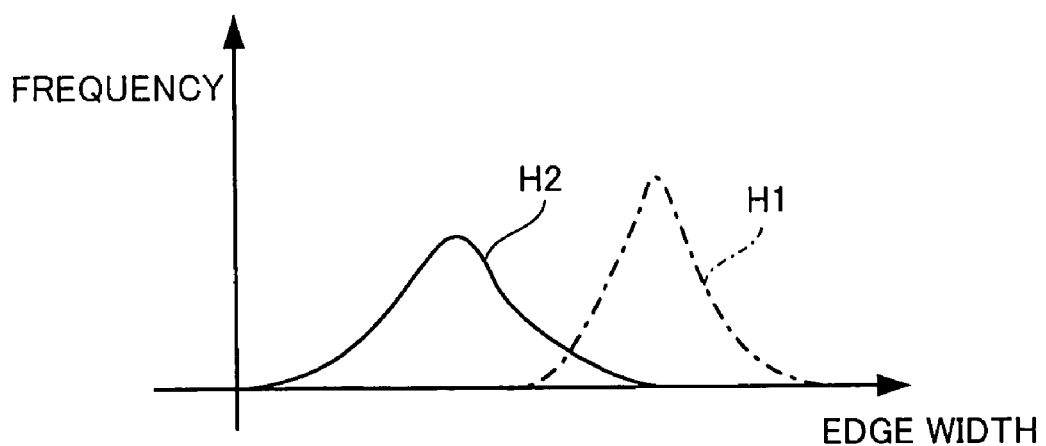
FIG. 11 is a diagram showing an example of two weakly correlated histograms.

FIG. 11 is a diagram showing an example of two weakly correlated histograms.

In the example in FIG. 11, first and second histograms H1 and H2 are away from each other along the horizontal axis, meaning that they are correlated weakly. Also, in this example, the first histogram H1 is away from the second histogram H2 in the direction of increasing edge width. This means that the direction corresponding to the first histogram H1 is closer to the direction of image blur than is the direction corresponding to the second histogram H2. The closer the direction of one of such two histograms to the direction of image blur, the smaller the correlation between the two histograms.

On the other hand, if the direction of the two histograms are equally away from the direction of the blur or if the image is not blurred, the two histograms are strongly correlated.

Figure 12:
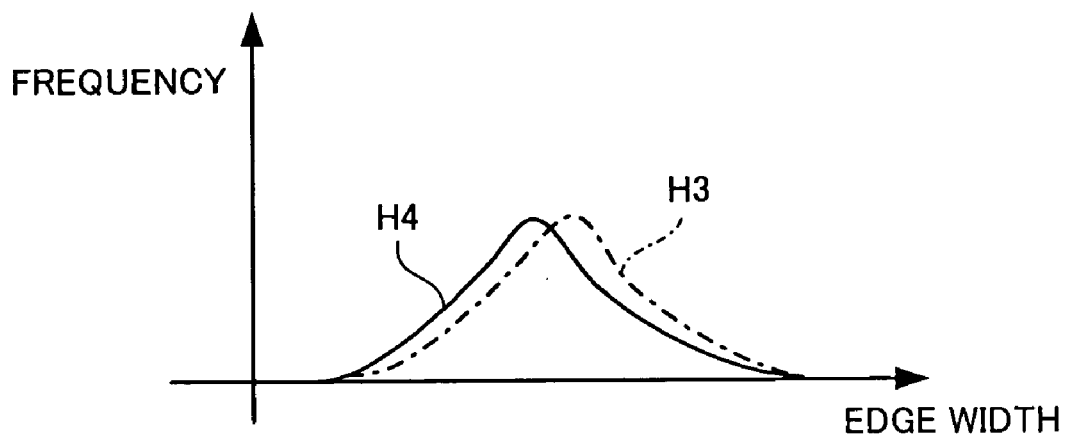
FIG. 12 is a diagram showing an example of two strongly correlated histograms.

FIG. 12 is a diagram showing an example of two strongly correlated histograms.

In the example in FIG. 12, first and second histograms H3 and H4 are close to each other along the horizontal axis, meaning that they are correlated strongly.

The blur direction calculation section 433 shown in FIG. 9 selects a pair of directions which minimizes the correlation between histograms from among the four pairs of directions, and then selects the direction corresponding to the larger edge width from the two directions in the selected pair as the direction of the image blur.

The blur width calculation section 434 shown in FIG. 9 calculates average value of edge widths in the direction of the blur determined by the blur direction calculation section 433, as the width of the image blur.

As described in detail above with reference to FIGS. 9 to 11, the blur analyzing section 430 shown in FIG. 5 determines the direction and width of image blur as blur information.

Next, description will be given of out-of-focus condition analyzing section 440 shown in FIG. 5.

If an image is out of focus, edges spread uniformly in all directions. Unlike the spread of edges resulting from blur, the spread of edges due to an out-of-focus condition is uniform without direction-dependent unevenness. Then, the out-of-focus condition analyzing section 440 according to the present embodiment determines respective edge widths from all the edge profiles passed by the edge analyzing section 420 as edge information and calculates the average value of the determined edge widths as out-of-focus condition information which represents the extent of out-of-focus condition of the image.

Then, the correction section 450 shown in FIG. 5 corrects the blur and out-of-focus condition of the input image by highlighting the edges of the input image using unsharp masking (USM), a known correction method, based on the blur information passed by the blur analyzing section 430 and out-of-focus condition information passed by the out-of-focus condition analyzing section 440.

Figure 13:
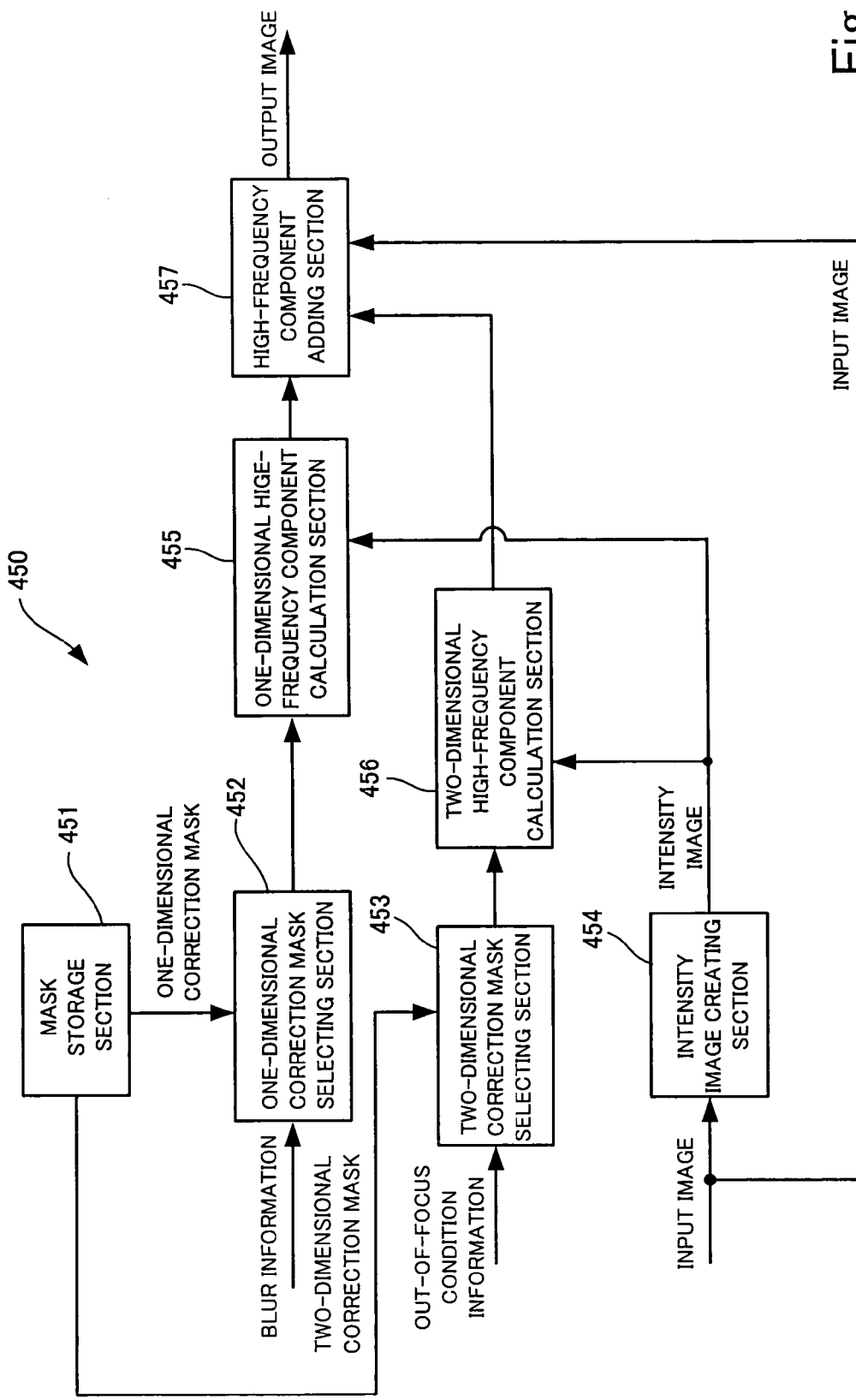
FIG. 13 is a block diagram showing details of the correction section shown in FIG. 5.

FIG. 13 is a block diagram showing details of the correction section shown in FIG. 5.

The correction section 450 shown in FIG. 13 has a mask storage section 451, one-dimensional correction mask selecting section 452, two-dimensional correction mask selecting section 453, intensity image creating section 454, one-dimensional high-frequency component calculation section 455, two-dimensional high-frequency component calculation section 456, and high-frequency component adding section 457.

The intensity image creating section 454 creates an intensity image from the input image to represent light and shade of the input image by intensity.

The mask storage section 451 stores multiple one-dimensional correction masks different from each other in size for each of the eight directions D1, . . . , and D8 shown in FIG. 7 to calculate one-dimensional high-frequency components along the direction of blur in intensity changes of the input image.

The mask storage section 451 also stores multiple two-dimensional correction masks different from each other in size to calculate isotropic two-dimensional high-frequency components of intensity changes in the input image in relation to out-of-focus condition which involves a uniform spread of edges in the input image.

The one-dimensional correction mask selecting section 452 receives blur information containing the direction and width of image blur from the blur analyzing section 430. The one-dimensional correction mask selecting section 452 selects a one-dimensional correction mask which matches the direction and width of blur represented by the blur information from among the multiple one-dimensional correction masks stored in the mask storage section 451. In so doing, the one-dimensional correction mask selecting section 452 selects a larger one-dimensional correction mask with increases in the width of the blur.

The two-dimensional correction mask selecting section 453 receives out-of-focus condition information containing out-of-focus width (average value of all the edge widths) from the out-of-focus condition analyzing section 440. The two-dimensional correction mask selecting section 453 selects a two-dimensional correction mask which matches the out-of-focus width represented by the out-of-focus condition information from among the multiple two-dimensional correction masks stored in the mask storage section 451. In so doing, the two-dimensional correction mask selecting section 453 selects a larger two-dimensional correction mask with increases in the out-of-focus width.

The one-dimensional high-frequency component calculation section 455 calculates the one-dimensional high-frequency component by applying the one-dimensional correction mask selected by the one-dimensional correction mask selecting section 452 to the intensity image created by the intensity image creating section 454.

The two-dimensional high-frequency component calculation section 456 calculates the two-dimensional high-frequency component by applying the two-dimensional correction mask selected by the two-dimensional correction mask selecting section 453 to the intensity image.

The high-frequency component adding section 457 adds the one-dimensional high-frequency component calculated by the one-dimensional high-frequency component calculation section 455 and the two-dimensional high-frequency component calculated by the two-dimensional high-frequency component calculation section 456 to the input image. This highlights intensity changes in the input image, and thereby generates an output image corrected for blur and out-of-focus condition As described above with reference to FIGS. 5 to 13, in the first image correction apparatus 400, the trimming section 410 extracts an image part near the center of the image, image part which has a color close to a predetermined reference color such as skin color, or other image part which contains a main subject rather than the background and the like and is liable to a relatively large blur from an input image. Then, blur is detected in the extracted image part. This makes it possible to correct the input image properly for blur.

Next, respective second embodiments of the image correction program storage medium, image correction method, and image correction apparatus according to the present invention will be described. The description will be focused on differences from the first embodiments to avoid redundancy.

Figure 14:
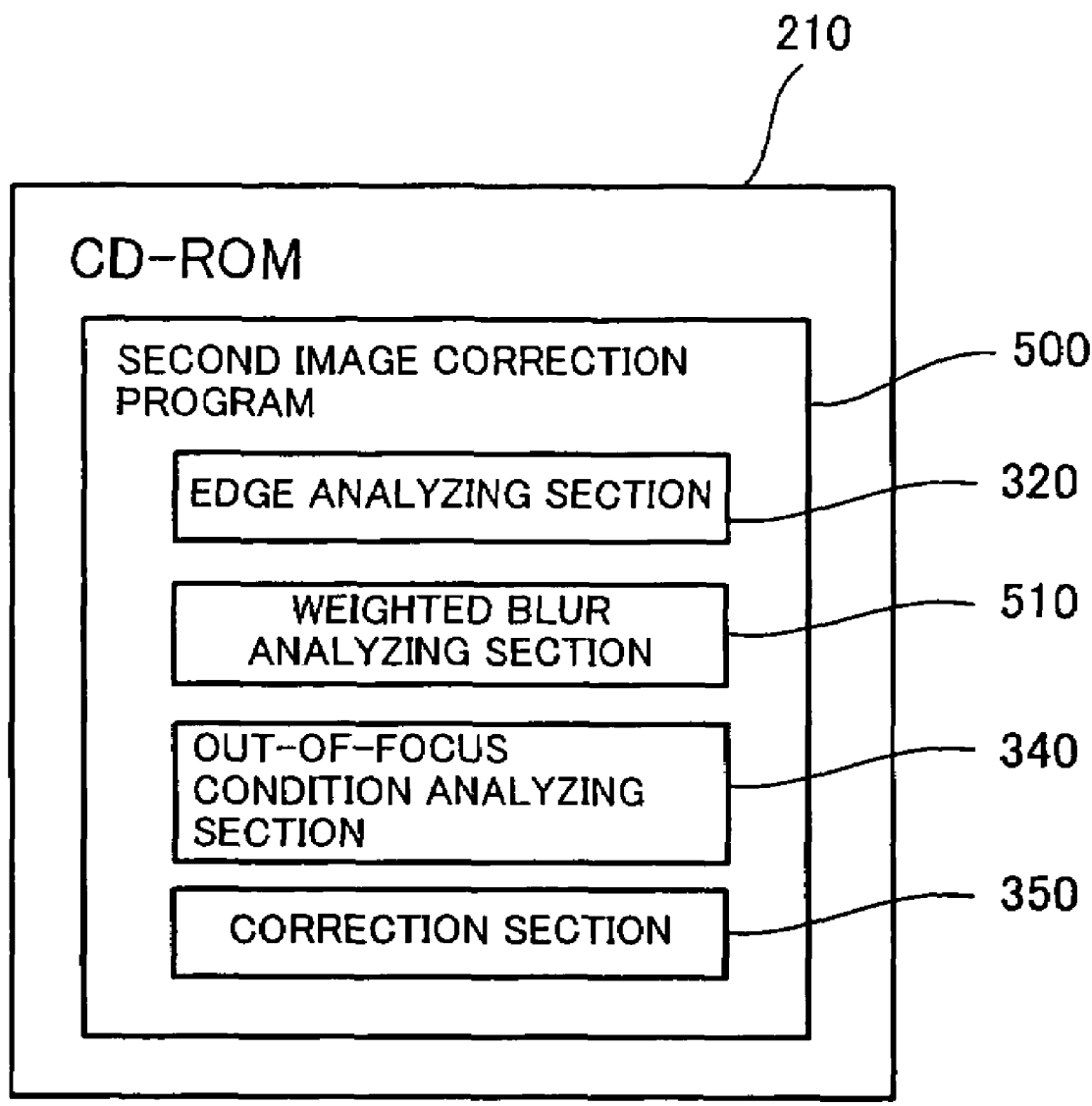
FIG. 14 is a conceptual diagram showing a CD-ROM which stores a second embodiment of the image correction program according to the present invention.

FIG. 14 is a conceptual diagram showing a CD-ROM which is a second embodiment of the image correction program storage medium according to the present invention. In FIG. 14, components equivalent to those in FIG. 3 are denoted by the same reference characters as those in FIG. 3.

A second image correction program 500 has an edge analyzing section 320, weighted blur analyzing section 510, out-of-focus condition analyzing section 340, and correction section 350. The edge analyzing section 320 of the second image correction program 500 provides an example of the blur detection section of the second image correction apparatus according to the present invention on the personal computer 10. Similarly, the weighted blur analyzing section 510 provides an example of the blur calculation section of the second image correction apparatus according to the present invention while the correction section 350 provides an example of the correction section of the second image correction apparatus according to the present invention. Details of various sections of the second image correction program 500 will be described together with operation of various components of the second embodiment of the image correction apparatus according to the present invention.

Next, description will be given of the second embodiment of the image correction method according to the present invention.

Figure 15:
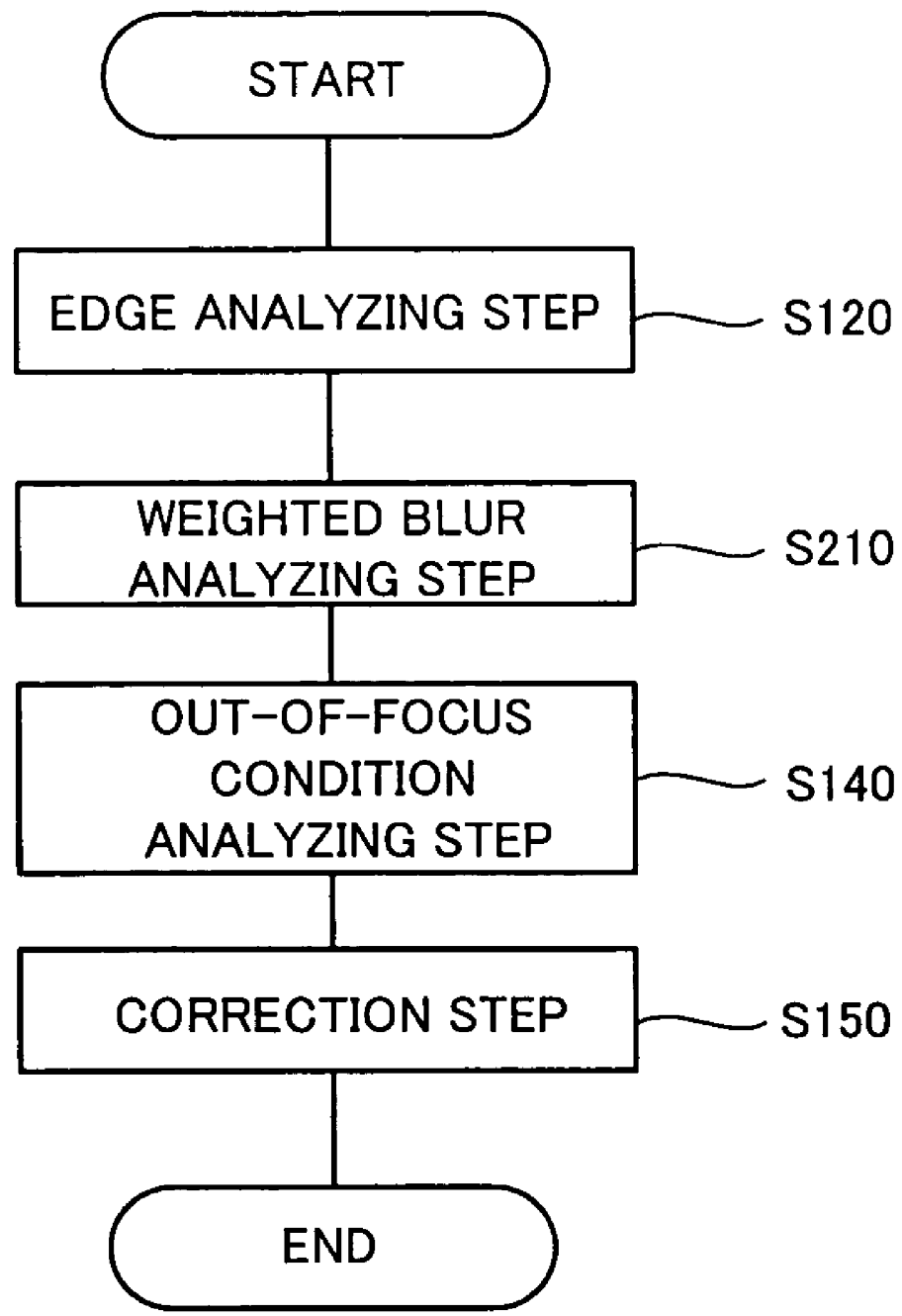
FIG. 15 is a flowchart showing a second embodiment of the image correction method according to the present invention.

FIG. 15 is a flowchart showing the second embodiment of the image correction method according to the present invention. In FIG. 15, steps equivalent to those in FIG. 4 are denoted by the same reference characters as those in FIG. 4.

The second image correction method shown in FIG. 15 has an edge analyzing step (step S120), weighted blur analyzing step (step S210), out-of-focus condition analyzing step (step S140), and correction step (step S150). The edge analyzing step (step S120), weighted blur analyzing step (step S210), and correction step (step S150) of the second image correction method provide examples of the blur detection step, blur calculation step, and correction step, respectively, of the second image correction method according to the present invention. Details of various steps in the second image correction method will also be described together with operation of various components of the second embodiment of the image correction apparatus according to the present invention.

Next, description will be given of the second embodiment of the image correction apparatus according to the present invention.

Figure 16:
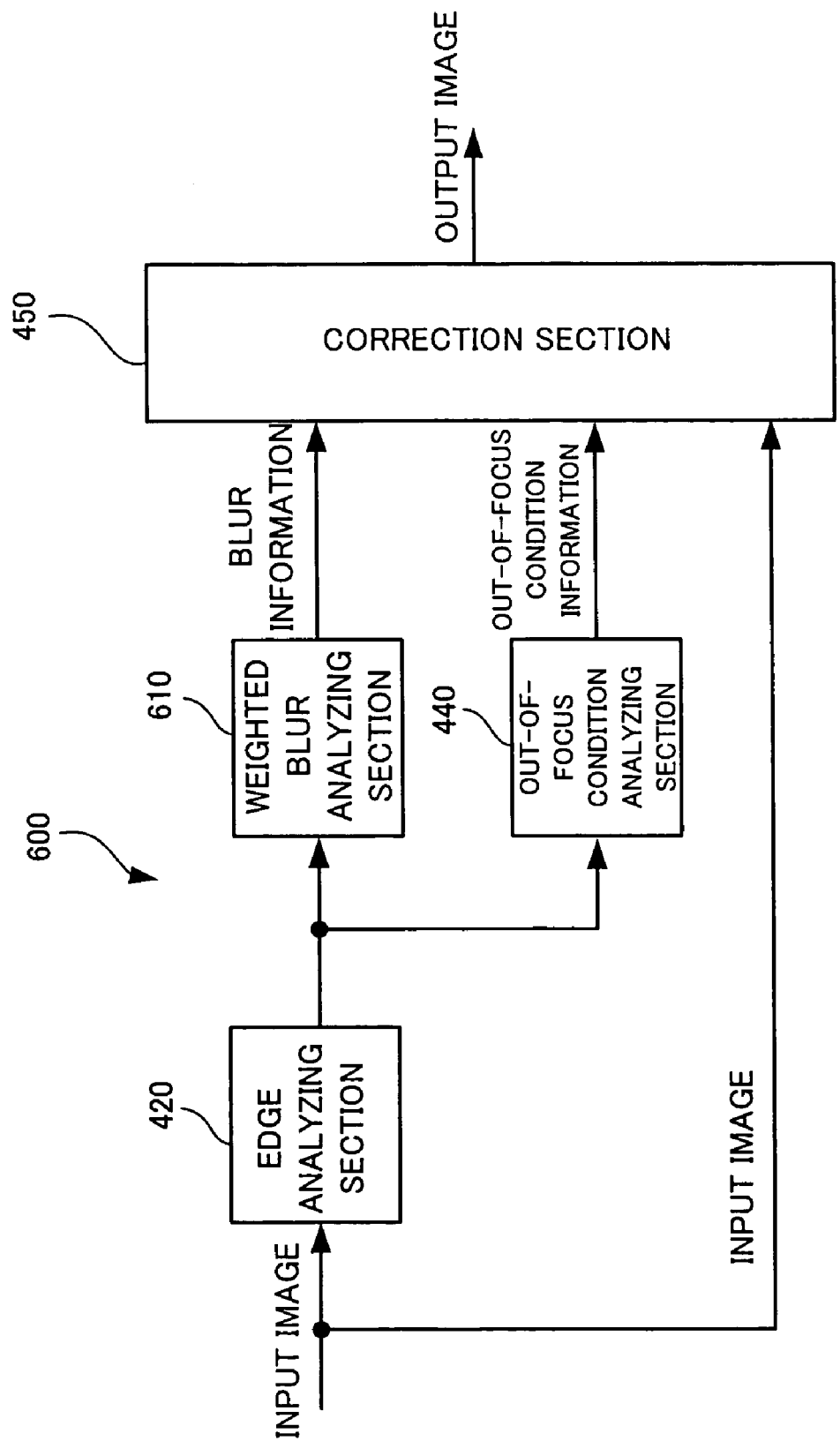
FIG. 16 is a functional block diagram showing a second embodiment of the image correction apparatus according to the present invention.

FIG. 16 is a functional block diagram showing the second embodiment of the image correction apparatus according to the present invention. In FIG. 16, components equivalent to those in FIG. 5 are denoted by the same reference characters as those in FIG. 5.

A second image correction apparatus 600 shown in FIG. 16 has an edge analyzing section 420, weighted blur analyzing section 610, out-of-focus condition analyzing section 440, and correction section 450. The edge analyzing section 420, weighted blur analyzing section 610, and correction section 450 of the second image correction apparatus 600 provide examples of the blur detection section, blur calculation section, and correction section, respectively, of the second image correction apparatus according to the present invention.

As is the case with the edge analyzing section 420 of the first image correction apparatus 400 shown in FIG. 5, the edge analyzing section 420 shown in FIG. 16 analyzes the edges in an image and creates edge information about the edges in the form of edge profiles such as those described above. However, whereas the edge analyzing section 420 of the first image correction apparatus 400 shown in FIG. 5 analyzes the edges in the trimmed image produced by the trimming section 410, the edge analyzing section 420 according to the present embodiment in FIG. 16 analyzes all the edges in an input image.

The weighted blur analyzing section 610 performs the analysis described below on the edge information produced by the edge analyzing section 420 and obtains blur information which represents the direction and width of the blur of the input image.

Figure 17:
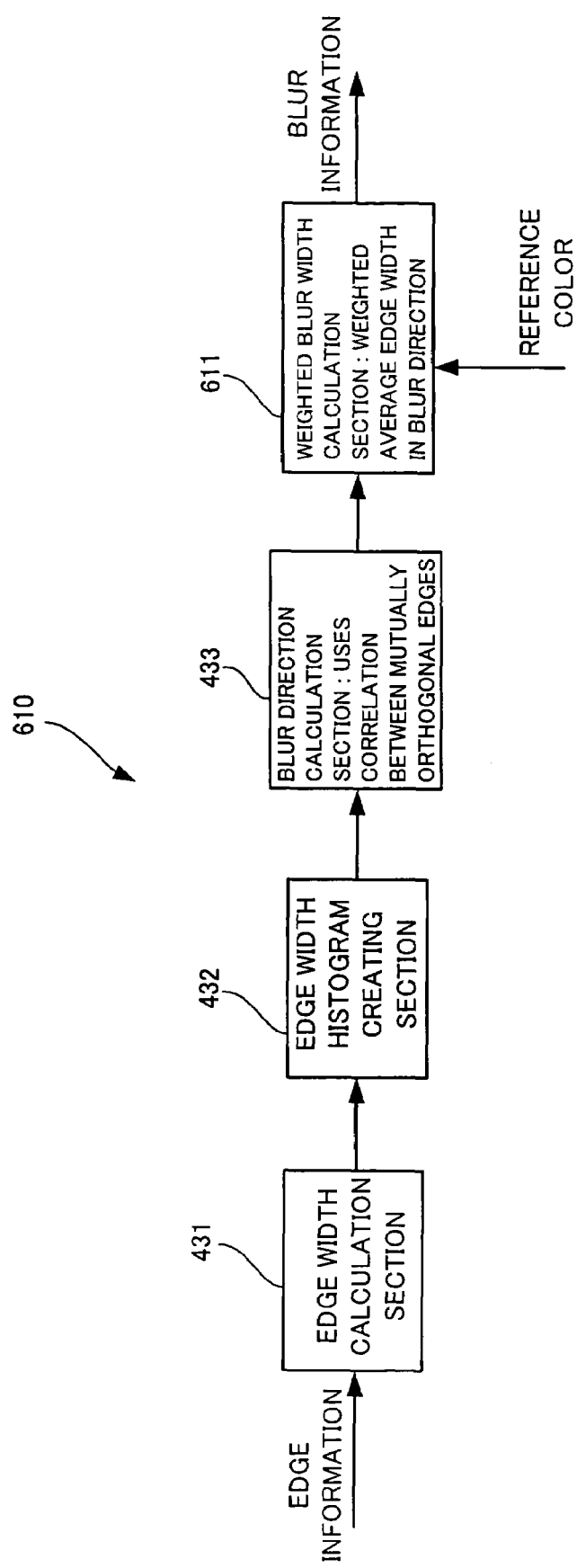
FIG. 17 is a block diagram showing details of the weighted blur analyzing section shown in FIG. 16.

FIG. 17 is a block diagram showing details of the weighted blur analyzing section shown in FIG. 16. In FIG. 17, components equivalent to those in FIG. 9 are denoted by the same reference characters as those in FIG. 9.

The weighted blur analyzing section 610 shown in FIG. 17 has an edge width calculation section 431, edge width histogram creating section 432, blur direction calculation section 433, and weighted blur width calculation section 611.

The weighted blur analyzing section 610 determines the direction of blur of the input image based on processes performed by components ranging from the edge width calculation section 431 to the blur direction calculation section 433.

The weighted blur width calculation section 611 first presents a message to the user, asking whether he/she wants to input a reference color such as skin color. The user gives an answer to the message. If the user expresses his/her wish to input a reference color, the weighted blur width calculation section 611 presents a message, prompting the user to specify a desired reference color. Then, the user specifies a reference color.

When the user finishes operations concerning a reference color, the weighted blur width calculation section 611 performs the arithmetic operations described below on the edge widths corresponding to the blur direction determined by the blur direction calculation section 433 and thereby determines an weighted average of the edge widths of the input image as the blur width of the input image.

Figure 18:
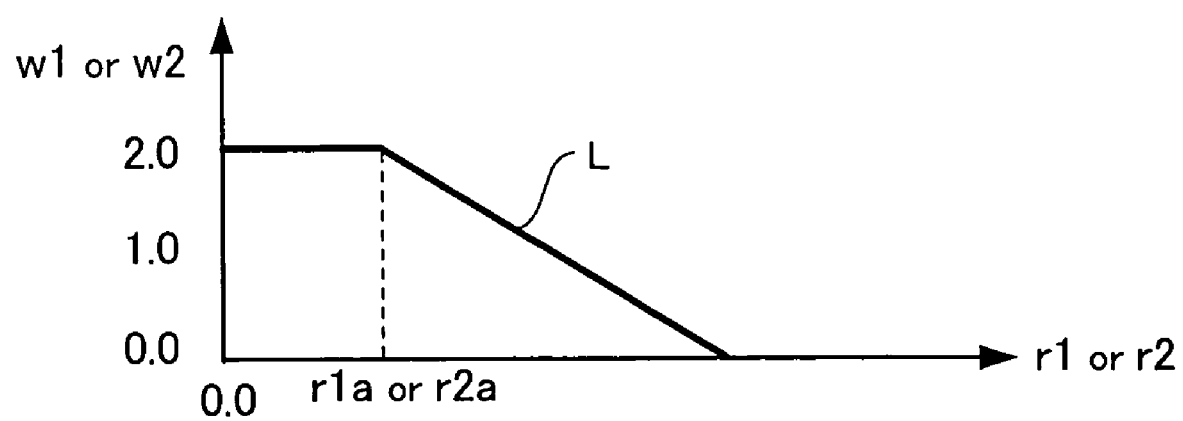
FIG. 18 is a diagram showing weights of edge widths.

FIG. 18 is a diagram showing weights of edge widths.

FIG. 18 shows a graph in which the vertical axis represents weight, the horizontal axis represents distance from a predetermined reference, and line L represents changes in the weight.

If the user has not expressed his/her desire to input a reference color in the above operations concerning a reference color, the weighted blur width calculation section 611 uses, as the weight described above, only weight w1 related to distance r1 from the center of the image to the edge. On the other hand, if the user has specified a reference color in the above operations concerning a reference color, the weighted blur width calculation section 611 uses two types of weight: weight w2 related to distance r2 between the reference color and the color of the edge in predetermined color space, and the weight w1 related to the distance r1 from the center.

The weight w1 related to the distance r1 from the center is "2" when the distance r1 is equal to or smaller than a predetermined threshold r1a, i.e., when the edge to be weighted is near the center of the image, but decreases with increasing distance from the center when the distance r1 exceeds the threshold r1a. On the other hand, the weight w2 related to the distance r2 from the reference color in predetermined color space is "2" when the distance r2 is equal to or smaller than a predetermined threshold r2a, i.e., when the color to be weighted is a color such as skin color which falls within a predetermined color range, but decreases with increasing distance from the reference color when the distance r2 exceeds the threshold r2a. In FIG. 18, changes in the two types of weight w1 and w2 are represented by the single line L.

An arithmetic operation used to determine a weighted average of edge widths will be described below, citing an example which uses both the two types of weight.

The weighted average of edge widths can be determined using the arithmetic operation given by the following formula, where vi is the width of a given edge, w1$i$ is the weight related to the position of the edge, and w2$i$ is the weight related to the color of the edge.

[Formula 1]

$$\text{Weighted average of edge widths} = \frac{\sum_i (w1_i \times w2_i \times v_i)}{\sum_i (w1_i \times w2_i)}$$

According to the present embodiment, the blur of the input image is corrected using the weighted average of edge widths determined as blur width. This correction process is equivalent to the correction process performed by the first image correction apparatus 400, and thus redundant description thereof will be omitted.

As described above with reference to FIGS. 16 to 18, in the second image correction apparatus 600, when determining the weighted average of edge widths used for blur correction, the weighted blur analyzing section 610 assigns high weight to edge widths in an image part near the center of the image, image part which has a color close to a predetermined reference color such as skin color, and other image part which contains a main subject rather than the background and the like and is liable to a relatively large blur. This makes it possible to correct the input image properly for blur.

Next, respective third embodiments of the image correction program storage medium, image correction method, and image correction apparatus according to the present invention will be described. They are slightly modified forms of the respective second embodiments of the image correction program storage medium, image correction method, and image correction apparatus according to the present invention. Thus, the description below will be focused on differences from the second embodiments to avoid redundancy.

Figure 19:
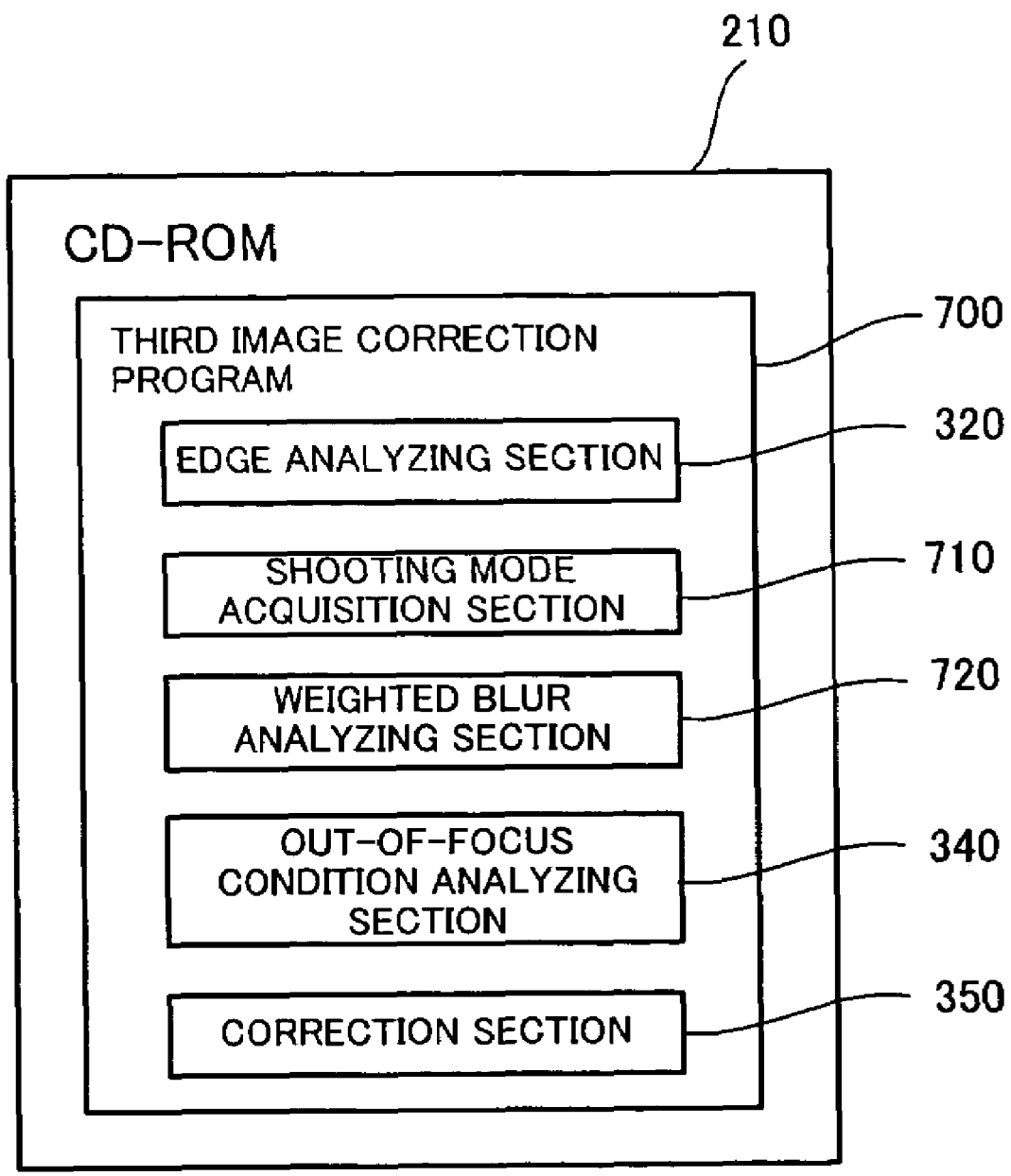
FIG. 19 is a conceptual diagram showing a CD-ROM which stores a third embodiment of the image correction program according to the present invention.

FIG. 19 is a conceptual diagram showing a CD-ROM which is a third embodiment of the image correction program storage medium according to the present invention. In FIG. 19, components equivalent to those in FIG. 14 are denoted by the same reference characters as those in FIG. 14, and thus redundant description thereof will be omitted.

A third image correction program 700 differs from the second image correction program 500 shown in FIG. 14 in that it has a shooting mode acquisition section 710 and a weighted blur analyzing section 720 different from the weighted blur analyzing section 510 shown in FIG. 14. The shooting mode acquisition section 710 of the third image correction program 700 provides an example of the shooting mode acquisition section of the second image correction apparatus according to the present invention while the weighted blur analyzing section 720 provides an example of the blur calculation section of the second image correction apparatus according to the present invention. Details of the shooting mode acquisition section 710 and weighted blur analyzing section 720 will be described together with operation of various components of the third embodiment of the image correction apparatus according to the present invention.

Next, description will be given of the third embodiment of the image correction method according to the present invention.

Figure 20:
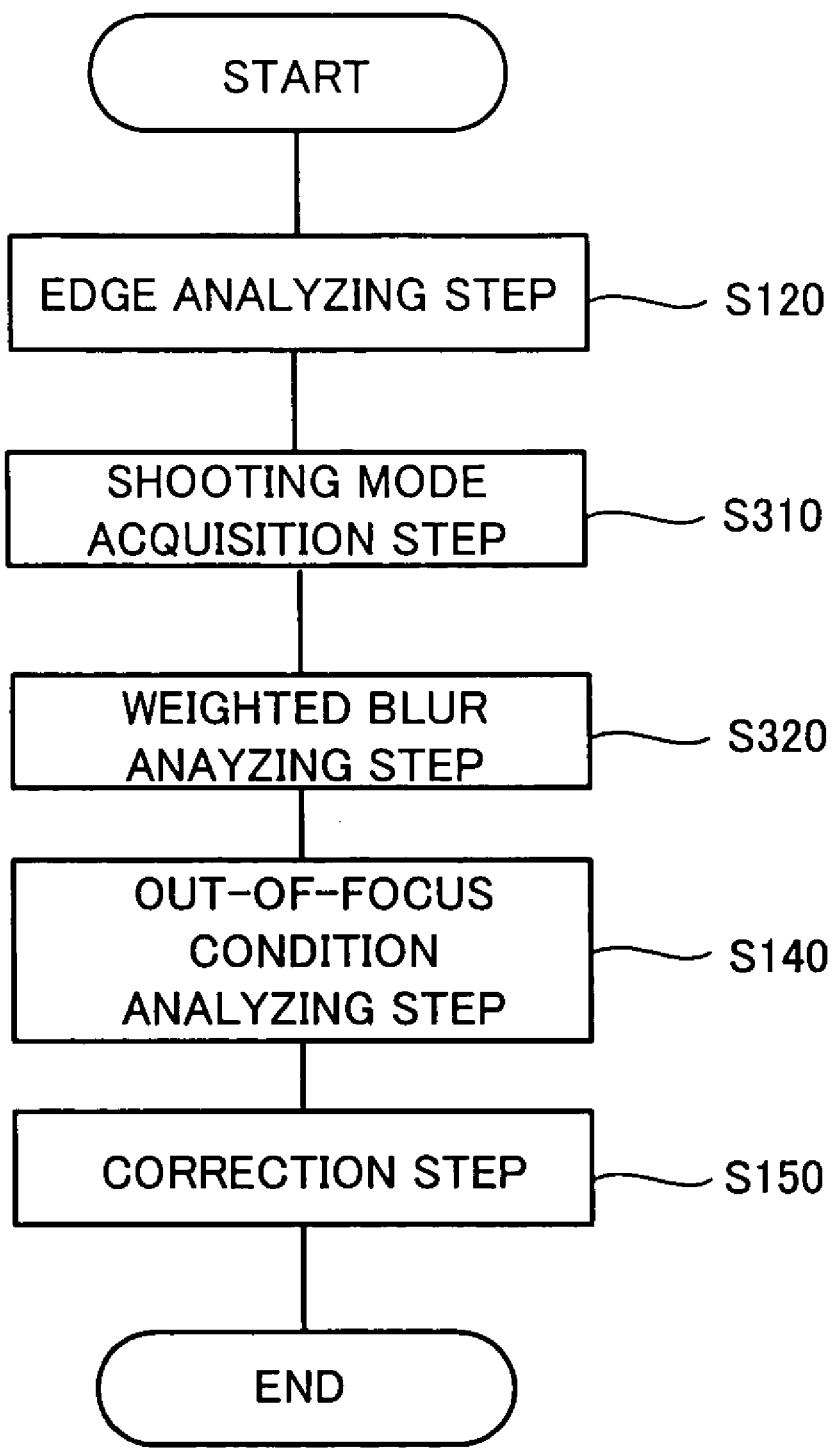
FIG. 20 is a flowchart showing a third embodiment of the image correction method according to the present invention.

FIG. 20 is a flowchart showing the third embodiment of the image correction method according to the present invention. In FIG. 20, steps equivalent to those in FIG. 15 are denoted by the same reference characters as those in FIG. 15, and thus redundant description thereof will be omitted.

The third image correction method shown in FIG. 20 differs from the second image correction method shown in FIG. 15 in that it has a shooting mode acquisition step (step S310) and a weighted blur analyzing step (step S320) different from the weighted blur analyzing step (step S210) shown in FIG. 15. The shooting mode acquisition step (step S310) and weighted blur analyzing step (step S320) in the flowchart of FIG. 20 provide examples of the shooting mode acquisition step and blur calculation step in the second image correction method according to the present invention. Details of the shooting mode acquisition step (step S310) and weighted blur analyzing step (step S320) will also be described together with operation of various components of the third embodiment of the image correction apparatus according to the present invention.

Next, description will be given of the third embodiment of the image correction apparatus according to the present invention.

Figure 21:
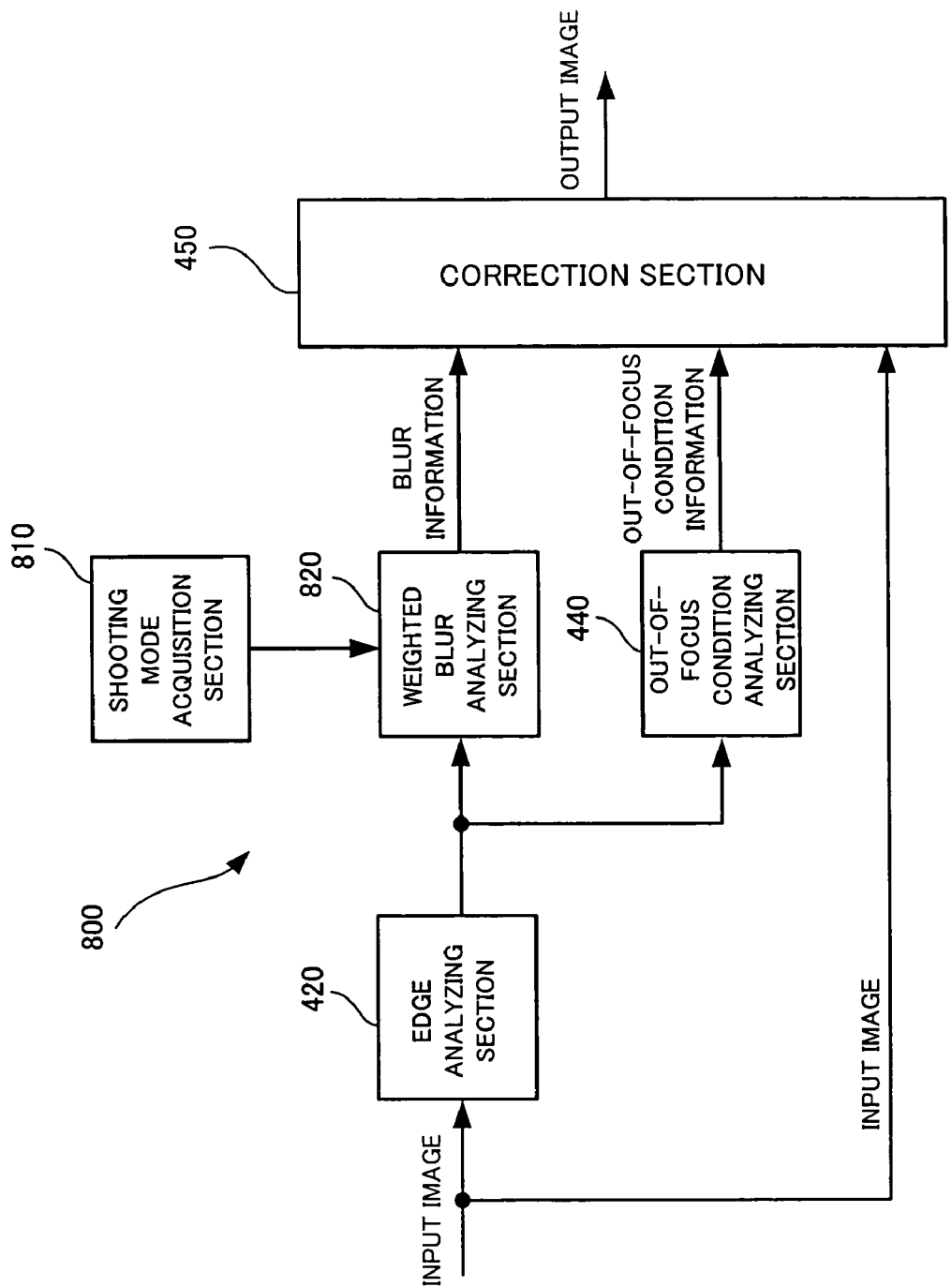
FIG. 21 is a functional block diagram showing a third embodiment of the image correction apparatus according to the present invention.

FIG. 21 is a functional block diagram showing the third embodiment of the image correction apparatus according to the present invention. In FIG. 21, components equivalent to those in FIG. 16 are denoted by the same reference characters as those in FIG. 16.

The third image correction apparatus 800 differs from the second image correction apparatus 600 shown in FIG. 16 in that it has a shooting mode acquisition section 810 and a weighted blur analyzing section 820 different from the weighted blur analyzing section 610 shown in FIG. 16. The shooting mode acquisition section 810 of the third image correction apparatus 800 provides an example of the shooting mode acquisition section of the second image correction apparatus according to the present invention while the weighted blur analyzing section 820 provides an example of the blur calculation section of the second image correction apparatus according to the present invention.

According to the present embodiment, it is assumed that the input image has been shot by a photographic device in one of three shooting modes: portrait mode intended to shoot portraits, landscape mode intended to shoot landscapes, and standard mode intended to shoot standard pictures. It is also assumed that mode information which indicates the shooting mode of the input image is attached to the input image.

The shooting mode acquisition section 810 acquires the mode information attached to the input image and transmits the mode information to the weighted blur analyzing section 820.

The weighted blur analyzing section 820 produces blur information which represents the direction and width of the blur of the input image using a method almost equivalent to the one used by the weighted blur analyzing section 610 shown in FIG. 16. However, the weighted blur analyzing section 820 shown in FIG. 21 differs from the weighted blur analyzing section 610 shown in FIG. 16 in that the blur width is determined based on the mode information transmitted from the shooting mode acquisition section 810. Now description will be given of how the blur width is determined based on the mode information.

The weighted blur analyzing section 610 shown in FIG. 16 determines the weight w1 related to the distance r1 from the center of the input image used as the reference position and the weight w2 related to the distance r2 in predetermined color space between the reference color specified by the user and the color of the edge based on the line L on the graph shown in FIG. 18, substitutes the determined weights w1 and w2 into the arithmetic expression in Formula 1, and thereby determines the weighted average of the edge widths vi as the blur width of the input image.

In contrast, the weighted blur analyzing section 820 shown in FIG. 21 determines reference position, reference color, and maximum values of two types of weight w1 and w2 based on the mode information. According to the present embodiment, the reference position, reference color, and maximum values of two types of weight w1 and w2 are determined using a table such as the one shown below.

FIG. 22 is a diagram showing a table used to determine reference positions, reference colors, and maximum values of two types of weight w1 and w2.

A table Ta shown in FIG. 22 defines three shooting modes—portrait mode, landscape mode, and standard mode—by associating them with reference positions, reference colors, and ratios between the maximum values of two types of weight w1 and w2.

In the case of the standard mode, assuming that the images shot in the standard mode contain people in the center, the intersection of the horizontal and vertical centers of the image is defined as the reference position. Also, the reference color is defined to be skin color, assuming the faces of people. Furthermore, the ratio between the maximum values of two types of weight w1 and w2 is defined to be "1:2," meaning that the weight w2 related to the color of the edge is larger.

In the case of the portrait mode, since portraits show the face of a person at a position slightly higher than the center of the image, the position at the horizontal center and ⅔ from the bottom of the image is defined as the reference position. Also, the reference color is defined to be skin color. Furthermore, the ratio between the maximum values of two types of weight w1 and w2 is defined to be "2:1," meaning that the weight w1 related to the position of the edge is larger.

In the case of the landscape mode, since the center of images often shows green color, the intersection of the horizontal and vertical centers of a given image is defined as the reference position and green is defined as the reference color. Furthermore, the ratio between the maximum values of two types of weight w1 and w2 is defined to be "1:1," meaning that the weight w1 related to the distance from the reference position and weight w2 related to the distance from the reference color have the same weight.

The weighted blur analyzing section 820 shown in FIG. 21 first determines reference position, reference color, and maximum values of two types of weight w1 and w2 for the shooting mode indicated by the mode information transmitted from the shooting mode acquisition section 810, using the table Ta shown in FIG. 2. Besides, the weighted blur analyzing section 820 determines the maximum values of two types of weight w1 and w2: namely, it sets the maximum value of the larger weight to "2.0" and the maximum value of the smaller weight to "1.0" if the ratio is "1:2" or "2:1," and sets the maximum value of both types of weight w1 and w2 to "2.0" if the ratio is "1:1." Then, based on the reference position, reference color, and maximum values of two types of weight w1 and w2 thus determined, the weighted blur analyzing section 820 determines the weighted average of the edge widths vi as the blur width of the input image using the same computational method as the one used by the weighted blur analyzing section 610 shown in FIG. 16.

With the third image correction apparatus 800 described above, since the reference position and the maximum values of the position-related weight and color-related weight used for calculation of the blur width of the input image are determined according to the shooting mode, the blur width can be determined accurately and the input image can be corrected accurately. Besides, the third image correction apparatus 800 also determines reference color according to the shooting mode, reducing the burden on the user.

Next, description will be given of a first embodiment of the image correction system according to the present invention.

Figure 23:
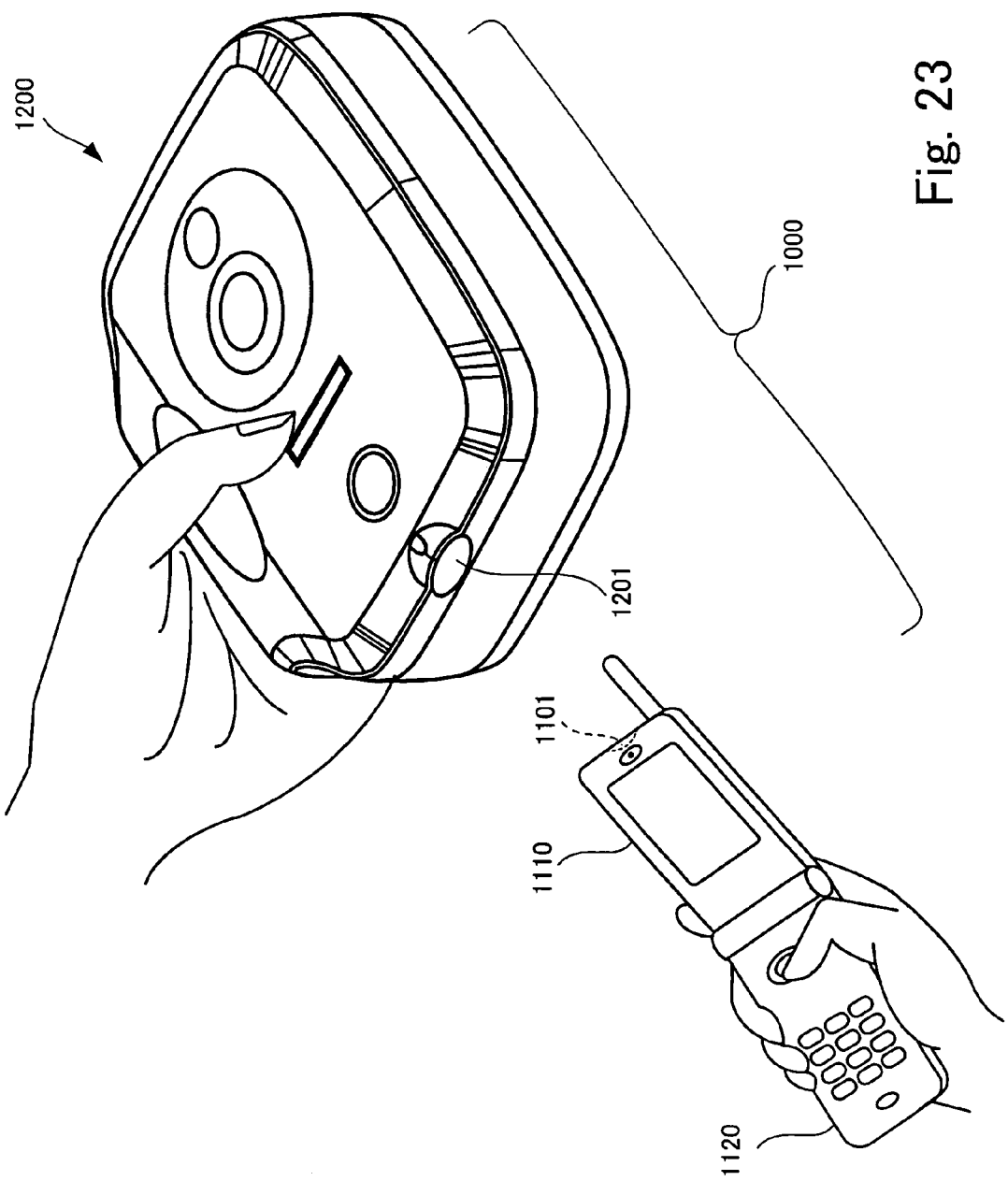
FIG. 23 is an external view showing a first image transmitter-printer system which is a first embodiment of the image correction system according to the present invention.

FIG. 23 is an external view showing the first image transmitter-printer system which is a first embodiment of the image correction system according to the present invention.

The first image transmitter-printer system 1000 shown in FIG. 23 has a camera-equipped cell phone 1100 and mobile printer 1200 which prints images based on image data transmitted from the cell phone 1100. Here, the cell phone 1100 provides an example of a photographic device with a built-in image transmitter device according to the first image correction system of the present invention while the mobile printer 1200 provides an example of a printer with a built-in image receiver device according to the first image correction system of the present invention.

The cell phone 1100 has an upper part 1110 with an image taking camera lens provided on the back and a lower part 1120 equipped with operation keys and a voice input port. The cell phone 1100 can photograph a subject in response to a user action and generate image data which expresses a color image in three colors of R (Red), G (Green), and B (Blue). As described later, the cell phone 1100 produces blur information about the image provided as the image data obtained by shooting and out-of-focus condition information which represents the extent of out-of-focus condition of the image.

Also, the cell phone 1100 has an infrared transmitter/receiver section 1101 mounted on its upper part 1110 to transmit or receive infrared rays and can transmit the image data from the infrared transmitter/receiver section 1101 to the mobile printer 1200 by infrared communications in response to a user action. In so doing, the cell phone 1100 reduces the data volume of the image data obtained by shooting according to image blur and transmits the reduced image data. This reduces the time required for transmission. Also, the blur information and out-of-focus condition information are transmitted to the mobile printer 1200 together with the image data.

The mobile printer 1200 is equipped with an infrared transmitter/receiver section 1201 as is the case with the cell phone 1100 and the infrared transmitter/receiver section 1201 receives the reduced image data, blur information, and out-of-focus condition information transmitted from the cell phone 1100. The mobile printer 1200 performs an image correction process on the reduced image data based on the blur information and out-of-focus condition information, corrects the blur and out-of-focus condition of the image provided by the image data, and prints the corrected image on an instant film sheet. The mobile printer 1200 is compact and lightweight and the user can print an image by holding both mobile printer 1200 and cell phone 1100 in his/her hand as shown in FIG. 23.

Next, description will be given of internal configurations of the cell-phone 1100 and mobile printer 1200 which compose the first image transmitter-printer system 1000.

Figure 24:
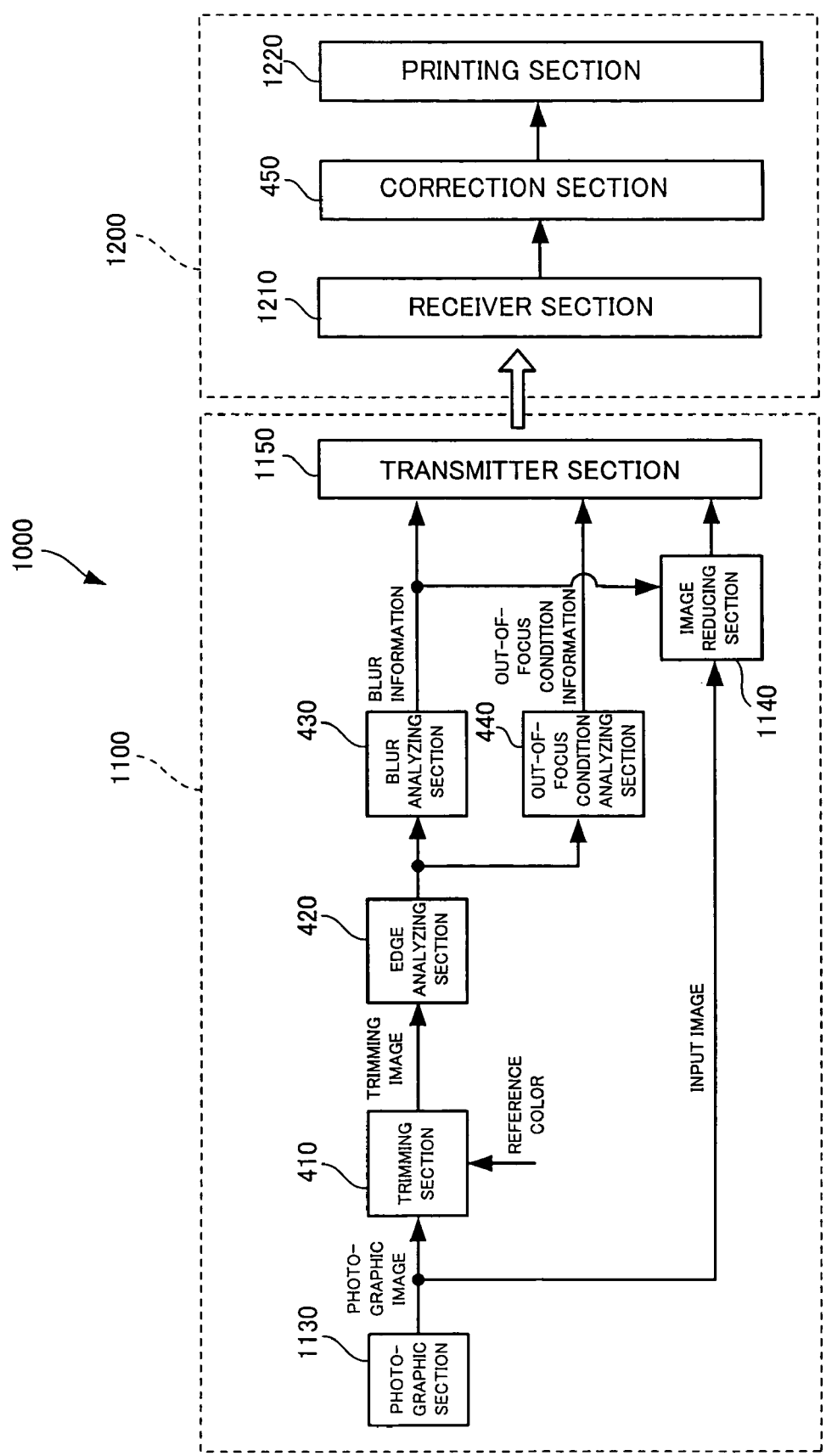
FIG. 24 is a functional block diagram showing internal configurations of a cell phone 1100 and mobile printer which compose the first image correction system shown in FIG. 23.

FIG. 24 is a functional block diagram showing the internal configurations of the cell phone 1100 and mobile printer 1200 which compose the first image correction system shown in FIG. 23.

The telephone functions of the cell phone 1100 are neither shown nor described herein because they go off the subject of the present invention.

The cell phone 1100 has a photographic section 1130 which photographs a subject using the image taking camera lens and generates image data of the photographic image.

To obtain blur information about the image obtained by shooting and out-of-focus condition information which represents the extent of out-of-focus condition of the image, the cell phone 1100 has the same components as the trimming section 410, edge analyzing section 420, blur analyzing section 430, and out-of-focus condition analyzing section 440 used to obtain blur information and out-of-focus condition information on the first image correction apparatus 400 shown in FIG. 5. In the cell phone 1100 shown in FIG. 24, the same components as those of the first image correction apparatus 400 shown in FIG. 5 are denoted by the same reference characters as the corresponding components in FIG. 5. The combination of the trimming section 410, edge analyzing section 420, and blur analyzing section 430 shown in FIG. 24 provides an example of the blur detection section of the first image correction system according to the present invention. Redundant description of the trimming section 410, edge analyzing section 420, blur analyzing section 430, and out-of-focus condition analyzing section 440 shown in FIG. 24 will be omitted.

In addition to the above components, the cell phone 1100 in FIG. 24 has an image reducing section 1140 and a transmitter section 1150. The image reducing section 1140 and the transmitter section 1150 provide examples of the resolution lowering section and the transmitter section, respectively, of the first image correction system according to the present invention.

The blur analyzing section 430 determines the blur direction and width of the image provided as the image data obtained by shooting, and thereby produces blur information which represents blur of the image. The blur information is passed to the image reducing section 1140 as well as to the transmitter section 1150.

The image reducing section 1140 reduces resolution of the image according to the blur width indicated by the received blur information, and thereby reduces the data volume of the image data obtained by shooting. To reduce the resolution, the image reducing section 1140 increases pixel width, thereby bringing it close to the blur width. In so doing, even if the resolution is reduced, if the pixel width is kept below the blur width, apparent changes of the image are also suppressed. Consequently, the image reducing section 1140 reduces the data volume of the image data obtained by shooting without significantly degrading the image provided by the image data. The image data reduced in volume is passed to the transmitter section 1150.

In addition to the reduced image data and the blur information, the out-of-focus condition information which represents the extent of out-of-focus condition of the image is passed to the transmitter section 1150 from the blur analyzing section 430. The transmitter section 1150 transmits the reduced image data, the blur information, and the out-of-focus condition information to the mobile printer 1200 by infrared rays via the infrared transmitter/receiver section 1101 shown in FIG. 23 in response to a user action.

The mobile printer 1200 has a receiver section 1210 which receives infrared signals via the infrared transmitter/receiver section 1201. The receiver section 1210 provides an example of the receiver section of the first image correction system according to the present invention. Also, the mobile printer 1200 has the same components as does the correction section 450 which corrects the blur and out-of-focus condition of the input image in the first image correction apparatus 400 shown in FIG. 5. In FIG. 24, the same components as those of the correction section 450 in FIG. 5 are denoted by the same reference characters as the corresponding components in FIG. 5. The correction section 450 in FIG. 24 provides an example of the correction section of the first image correction system according to the present invention. Redundant description of the correction section 450 shown in FIG. 24 will be omitted. Furthermore, the mobile printer 1200 has a printing section 1220 which prints the image corrected for blur by the correction section 450.

The receiver section 1210 receives the reduced image data, the blur information, and the out-of-focus condition information from the cell phone 1100 and passes them to the correction section 450. The correction section 450 corrects the image provided as the reduced image data for the blur and out-of-focus condition and the corrected image is printed out by the printing section 1220.

As described above with reference to FIGS. 23 and 24, the first image correction system 1000 not only outputs an image corrected for blur and out-of-focus condition via the mobile printer 1200, but also transmits the image data obtained by shooting from the cell phone 1100 to the mobile printer 1200 after reducing the data volume of the image data without significantly degrading the image. This makes it possible to reduce the time required for transmission without image degradation.

Next, description will be given of a second embodiment of the image correction system according to the present invention.

Figure 25:
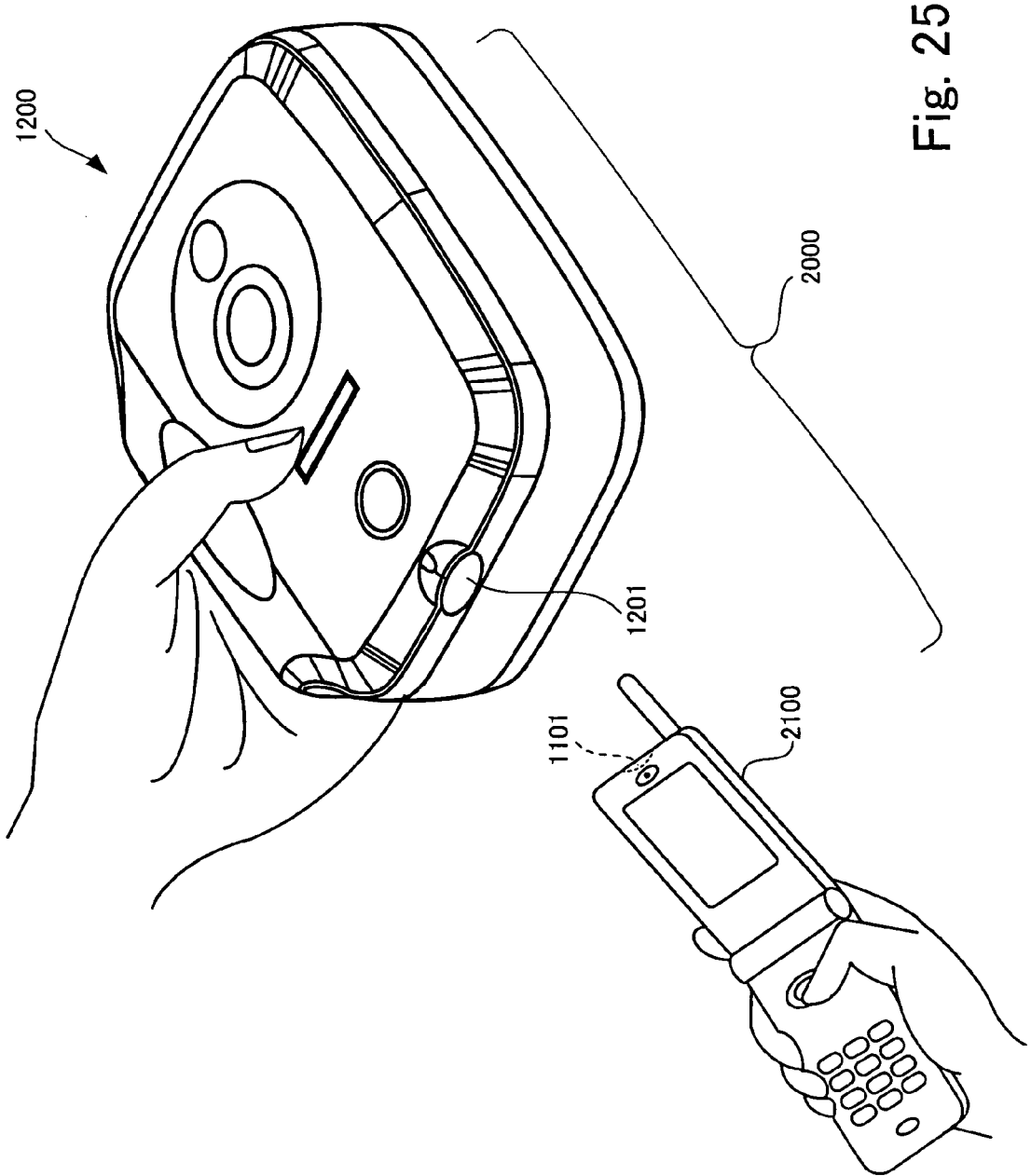
FIG. 25 is an external view showing a second image transmitter-printer system which is a second embodiment of the image correction system according to the present invention.

FIG. 25 is an external view showing a second image transmitter-printer system which is a second embodiment of the image correction system according to the present invention.

A second image transmitter-printer system 2000 shown in FIG. 25 is equivalent to the first image transmitter-printer system 1000 except that it has a cell phone 2100 different from the cell phone 1100 of the first image transmitter-printer system 1000 in FIG. 23. In the second image transmitter-printer system 2000, the cell phone 2100 provides an example of a photographic device with a built-in image transmitter device according to the second image correction system of the present invention while a mobile printer 1200 provides an example of a printer with a built-in image receiver device according to the second image correction system of the present invention.

Figure 26:
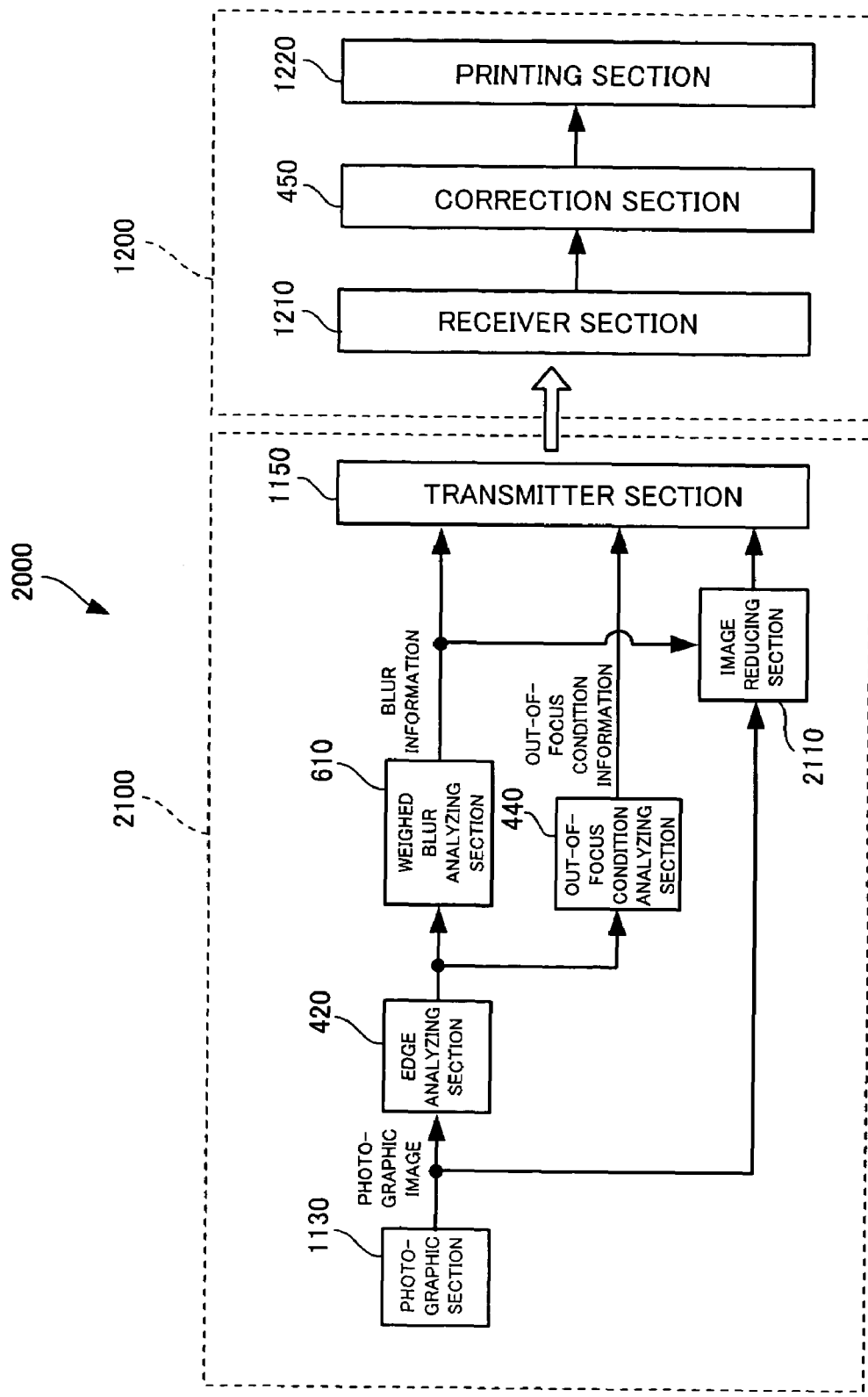
FIG. 26 is a functional block diagram showing internal configurations of a cell phone 2100 and mobile printer which compose the second image correction system shown in FIG. 25.

FIG. 26 is a functional block diagram showing internal configurations of the cell phone 1100 and mobile printer which compose the second image correction system shown in FIG. 25.

As shown in FIG. 26, the internal configuration of the cell phone 2100 is different from that of the cell phone 1100 in FIG. 23: to obtain blur information about the image obtained by shooting and out-of-focus condition information which represents the extent of out-of-focus condition of the image, the cell phone 2100 has the same components as the edge analyzing section 420, the weight blur section 610, and out-of-focus condition analyzing section 440 used to obtain blur information and out-of-focus condition information on the second image correction apparatus 600 shown in FIG. 16. In the cell phone 2100 shown in FIG. 26, the same components as those of the second image correction apparatus 600 shown in FIG. 16 are denoted by the same reference characters as the corresponding components in FIG. 16. The cell phone 2100 also has the same components as the photographic section 1130 and transmitter section 1150 of the cell phone 2100 shown in FIG. 2. These components are denoted by the same reference characters as the corresponding components in FIG. 23. Here, the edge analyzing section 420, the weighted blur analyzing section 610, and transmitter section 1150 of the cell phone 2100 provide examples of the blur detection section, blur calculation section, and transmitter section, respectively, of the second image correction system according to the present invention.

In addition to the above components, the cell phone 2100 in FIG. 26 also has an image reducing section 2110, which provides an example of the resolution lowering section of the second image correction system according to the present invention.

The image reducing section 2110 reduces the resolution of the image provided as the image data obtained by shooting according to the weighted average of edge widths determined by the weighted blur analyzing section 610. Consequently, the image data is reduced in data volume without significantly degrading the image. The image data reduced in data volume is passed to the transmitter section 1150 and transmitted to the same mobile printer as the mobile printer 1200 in FIG. 24. In FIG. 26, the mobile printer and its components are denoted by the same reference characters as the corresponding components in FIG. 24. The receiver section 1210 and correction section 450 of the mobile printer 1200 in FIG. 26 provide examples of the receiver section and correction section, respectively, of the second image correction system according to the present invention.

As is the case with the first image correction system 1000 shown in FIGS. 23 and 24, the second image correction system 2000 shown in FIGS. 25 and 26 transmits the image data obtained by shooting from the cell phone 2100 to the mobile printer 1200 after reducing the data volume of the image data without significantly degrading the image. This makes it possible to reduce the time required for transmission without image degradation.

Incidentally, although an image part located near the center of an image and containing a color specified by the user has been used as an example of the main subject area according to the present invention, the present invention is not limited to this. The main subject area according to the present invention may be, for example, an image part or the like existing in a location specified by the user, an image part containing a color specified by the user irrespective of the location in the image, or an image part or the like containing a color within a certain color range obtained through automatic analysis of color distribution and color saturation of the image rather than by user specification.

Also, although it has been stated as an example that the blur calculation section according to the present invention increases weights with increases in the distance from the center of the image or the reference position according to the shooting mode, or the distance in predetermined color space from the reference color specified by the user or reference color according to the shooting mode, the present invention is not limited to this. The blur calculation section according to the present invention may increase weights, for example, with increases in the distance in predetermined color space from the reference color, or with increases in the distance in predetermined color space from a specific color obtained through automatic analysis of color distribution and color saturation of the image rather than a reference color specified by the user or reference color according to the shooting mode.

What is claimed is:

1. An image correction apparatus which corrects image blur caused by movement of a photographic device shooting an image, comprising:
   a blur detection section which detects blur of the image in a main subject area of the image; and
   a correction section which corrects the blur detected by the blur detection section; wherein the blur detection section comprises:
      an edge analyzing section , which creates multiple edge profiles based on edge analysis post image capture in the context of a single frame, said edge profiles including edge width information,
      a blur direction calculating section, which uses said edge width information to calculate a direction of the blur caused by the movement of the photografic device,
      a blur width calculating section, which calculates an image blur width, said image blur width being an average value of edge widths in the direction of the blur calculated by the blur direction calculating section, and
      an of-focus condition analyzing section, which calculates an out-of-focus condition, said out-of-focus condition being an average value edge width in all directions; and
   wherein the correction section corrects the image based on the calculated image blur width and the calculated out-of-focus condition.

2. The image correction apparatus according to claim 1, wherein the blur detection section detects blur of the image using an image part in a predetermined range containing the center of the image as the main subject area.

3. The image correction apparatus according to claim 1, wherein the blur detection section detects blur of the image using an image part which has a color in a predetermined color range as the main subject area.

4. An image correction apparatus which corrects image blur caused by movement of a photographic device shooting an image, comprising:
   a blur detection section which detects blur in a plurality of locations in the image;
   wherein the blur detection section comprises:
      an edge analyzing section, which creates multiple edge profiles based on edge analysis post image capture in the context of a single frame, said edge profiles including edge width information,
      a blur direction calculating section, which uses said edge width information to calculate a direction of the blur caused by the movement of the photographic device,
      a blur width calculating section, which calculates an image blur width, said image blur width being an average value of edge widths in the direction of the blur calculated by the blur direction calculating section, and
      an of-focus condition analyzing section, which calculates an out-of-focus condition, said out-of-focus condition being an average value edge width in all directions;
   a blur calculation section which calculates blur of the image by summing up detection results produced by the blur detection section at the plurality of locations with weights assigned to the detection results based on a predetermined weighing standard; and
   a correction section which corrects the blur of the image based on calculation results produced by the blur calculation section, wherein the correction section corrects the image based on the calculated image blur width and the calculated out-of-focus condition.

5. The image correction apparatus according to claim 4, wherein the blur calculation section gives lighter weights to detection results obtained at locations more distant from the center of the image.

6. The image correction apparatus according to claim 4, wherein the blur calculation section gives lighter weights to detection results obtained at locations having a color more different from a predetermined reference color.

7. The image correction apparatus according to claim 4, wherein
   the photographic device has a plurality of shooting modes for the shooting;
   the image correction apparatus has a shooting mode acquisition section which acquires a shooting mode used to shoot the image to be corrected for blur; and
   the blur calculation section assigns weights based on a weighing standard in accordance with the shooting mode acquired by the shooting mode acquisition section.

8. An image correction program storage medium storing an image correction program that runs on a computer and makes the computer operate as an image correction apparatus which corrects image blur caused by movement of a photographic device shooting an image, wherein the image correction program builds on the computer:
- a blur detection section which detects blur of the image in a main subject area of the image; and
- a correction section which corrects the blur detected by the blur detection section, wherein the blur detection section comprises:
  - an edge analyzing section, which creates multiple edge profiles based on edge analysis post image capture in the context of a single frame, said edge profiles including edge width information,
  - a blur direction calculating section, which uses said edge width information to calculate a direction of the blur caused by the movement of the photographic device,
  - a blur width calculation section, which calculates an image blur width, said image blur width being an average value of edge widths in the direction of the blur calculated by the blur direction calculating section, and
  - an out-of-focus condition analyzing section, which calculates an out-of-focus condition, said out-of-focus condition being an average value edge width in all directions; and
- wherein the correction section corrects the image based on the calculated image blur width and the calculated out-of-focus condition.

9. An image correction program storage medium storing an image correction program that runs on a computer and makes the computer operate as an image correction apparatus which corrects image blur caused by movement of a photographic device shooting an image, wherein the image correction program builds on the computer:
- a blur detection section which detects blur in a plurality of locations in the image;
- wherein the blur detection section comprises:
  - an edge analyzing section, which creates multiple edge profiles based on edge analysis post image capture in the context of the single frame, said edge profiles including width information,
  - a blur direction calculating section, which uses said edge width information to calculate a direction of the blur caused by the movement of the photographic device,
  - a blur width calculation section, which calculates an image blur width, said image blur width being an average value edge widths in the direction of the blur calculated by the blur direction calculating section, and
  - an out-of-focus condition analyzing section, which calculates an out-of-focus condition, said out-of-focus condition being an average value edge width in all directions; and
- a blur calculation section which calculates blur of the image by summing up detection results produced by the blur detection section at the plurality of locations with weights assigned to the detection results based on a predetermined weighing standard; and
- a correction section which corrects the blur of the image based on calculation results produced by the blur calculation section wherein the correction section corrects the imaged based on the calculated image blur width and the calculated out-of-focus condition.

10. An image correction method which corrects image blur caused by movement of a photographic device shooting an image, comprising:
- a blur detection step, performed by a blur detection section, said blur detection step comprising detecting blur of the image in a main subject area of the image; and
- a correction step of correcting the blur detected in the blur detection step wherein the blur detection step comprises:
  - an edge analyzing step of creating multiple edge profiles based on edge analysis post image capture in the context of a single frame, said edge profiles including edge width information,
  - a blur direction calculating step of using said edge width information to calculate a direction of the blur caused by the movement of the photographic device,
  - a blur width calculation step of calculating an image blur width, said image blur width being an average value edge widths in the direction of the blur calculated in the blur direction calculating step, and
  - an out-of-focus condition analyzing step of calculating an out-of-focus condition, said out-of-focus condition being an average value edge width in all directions; and
- wherein the correction steps comprises correcting the image based on the calculated image blur width and the calculated out-of-focus condition.

11. An image correction method which corrects image blur caused by movement of a photographic device shooting an image, comprising:
- a blur detection step, performed by a blur detection section, said blur detection step comprising detecting blur in a plurality of locations in the image;
- wherein the blur detection step comprises:
  - an edge analyzing step of creating multiple edge profiles based on edge analysis post image capture in the context of a single frame, said edge profiles including edge width information,
  - a blur direction calculating step of using said edge width information to calculate a direction of the blur caused by the movement of the photographic device,
  - a blur width calculation step of calculating an image blur width, said image blur width being an average value edge widths in the direction of the blur calculated in the blur direction calculating step, and
  - an out-of-focus condition analyzing step of calculating an out-of-focus condition, said out-of-focus condition being an average value edge width in all directions; and
- a blur calculation step of calculating blur of the image by summing up detection results produced in the blur detection step at the plurality of locations with weights assigned to the detection results based on a predetermined weighing standard; and
- a correction step of correcting the blur of the image based on calculation results produced in the blur calculation step, wherein the correction step comprises correcting the image based on the calculated image blur width and the calculated out-of-focus condition.

12. An image correction system which corrects image blur caused by movement of a photographic device shooting an image, comprising:
- an image transmitter device that comprises a blur detection section which detects blur of the image in a main subject area of the image, and a transmitter section which transmits the image and the blur detected by the blur detection section; and
- an image receiver device that comprises a receiver section which receives the image and blur from the transmitter section of the image transmitter device, and a correction section which corrects the blur contained in the image and received by the receiver section together with the image, wherein the blur detection section comprises:
- an edge analyzing section, which creates multiple edge profiles based on edge analysis post image capture in the context of the single frame, said edge profiles including width information,
- a blur direction calculating section, which uses said edge width information to calculate a direction of the blur caused by the movement of the photographic device,
- a blur width calculation section, which calculates an image blur width, said image blur width being an average value edge widths in the direction of the blur calculated by the blur direction calculating section, and
- an out-of-focus condition analyzing section, which calculates an out-of-focus condition, said out-of-focus condition being an average value edge width in all directions; and wherein the correction section corrects the image based on the calculated image blur width and the calculated out-of-focus condition.

13. An image correction system which corrects image blur caused by movement of a photographic device shooting an image, comprising:
- an image transmitter device that comprises a blur detection section which detects blur in a plurality of locations in the image, a blur calculation section which calculates blur of the image by summing up detection results produced by the blur detection section at the plurality of locations with weights assigned to the detection results based on a predetermined weighing standard, and a transmitter section which transmits the image and the blur calculated by the blur calculation section; and
- an image receiver device that comprises a receiver section which receives the image and blur from the transmitter section of the image transmitter device, and a correction section which corrects the blur contained in the image and received by the receiver section together with the image, wherein the blur detection section comprises:
- an edge analyzing section, which creates multiple edge profiles based on edge analysis post image capture in the context of the single frame, said edge profiles including width information,
- a blur direction calculating section, which uses said edge width information to calculate a direction of the blur caused by the movement of the photographic device,
- a blur width calculation section, which calculates an image blur width, said image blur width being an average value edge widths in the direction of the blur calculated by the blur direction calculating section, and
- an out-of-focus condition analyzing section, which calculates an out-of-focus condition, said out-of-focus condition being an average value edge width in all directions; and wherein the correction section corrects the image based on the calculated image blur width and the calculated out-of-focus condition.

14. The image correction system according to claim 12 or 13, wherein:
the image transmitter device comprises a resolution lowering section which lowers resolution of the image according to the blur of the image; and the transmitter section of the image transmitter device transmits the image whose resolution has been lowered by the resolution lowering section.

15. The image correction system according to claim 12 or 13, wherein:
the image transmitter device is incorporated in the photographic device; and
the image receiver device is incorporated in a printer which prints the image corrected for blur by the correction section.

16. The image correction apparatus according to claim 1, wherein the blur detection section distinguishes between blur in the main subject area of the image and blur in a non-main subject area of the image, and
wherein the blur correction section corrects the blur in the main subject area of the image.

17. The image correction apparatus according to claim 16, wherein said main subject area of the image has a color in a predetermined color range.

18. The image correction program storage medium storing an image correction program according to claim 8, wherein the blur detection section distinguishes between blur in the main subject area of the image and blur in a non-main subject area of the image, and
wherein the blur correction section corrects the blur in the main subject area of the image.

19. The image correction method according to claim 10, wherein the blur detection step comprises distinguishing between blur in the main subject area of the image and blur in a non-main subject area of the image, and
wherein the blur correction step comprises correcting the blur in the main subject area of the image.

20. The image correction system according to claim 12, wherein the blur detection section distinguishes between blur in the main subject area of the image and blur in a non-main subject area of the image, and
wherein the blur correction section corrects the blur in the main subject area of the image.

21. The image correction system according to claim 12, wherein the image is transmitted from the transmitter section to the receiver section wirelessly.

22. The image correction system according to claim 13, wherein the image is transmitted from the transmitter section to the receiver section wirelessly.

23. The image correction apparatus according to claim 4, wherein the blur calculation section uses a weighing standard which gives lighter weights to detection results obtained at locations more distant from a reference color.

24. The image correction apparatus according to claim 4, wherein the blur calculation section uses a weighing standard which assigns lighter weights to detection results obtained in a background of an image.

25. The image correction storage medium according to claim 9, wherein the blur calculation section uses a weighing standard which gives lighter weights to detection results obtained at locations more distant from a reference color.

26. The image correction storage medium according to claim 9, wherein the blur calculation section uses a weighing standard which assigns lighter weights to detection results obtained in a background of an image.

27. The image correction method according to claim 11, wherein the blur calculation step comprises using a weighing standard which gives lighter weights to detection results obtained at locations more distant from a reference color.

28. The image correction method according to claim 11, wherein the blur calculation step comprises using a weighing standard which assigns lighter weights to detection results obtained in a background of an image.

29. The image correction system according to claim 13, wherein the blur calculation section uses a weighing standard which gives lighter weights to detection results obtained at locations more distant from a reference color.

30. The image correction system according to claim 13, wherein the blur calculation section uses a weighing standard which assigns lighter weights to detection results obtained in a background of an image.

* * * * *